United States Patent
Thompson et al.

(10) Patent No.: US 10,365,449 B2
(45) Date of Patent: Jul. 30, 2019

(54) MODULAR FIBER FRAME

(71) Applicant: Corning Research & Development Corporation, Corning, NY (US)

(72) Inventors: Zachary M. Thompson, Austin, TX (US); Jonathan V. Haggar, Austin, TX (US); Victor J. Borer, Austin, TX (US); Robert R. Mertz, Cedar Park, TX (US); Adam J. Krozel, Austin, TX (US)

(73) Assignee: Corning Research & Development Corporation, Corning, NY (US)

(*) Notice: Subject to any disclaimer, the term of this patent is extended or adjusted under 35 U.S.C. 154(b) by 26 days.

(21) Appl. No.: 15/698,133

(22) Filed: Sep. 7, 2017

(65) Prior Publication Data
US 2018/0074275 A1  Mar. 15, 2018

Related U.S. Application Data

(60) Provisional application No. 62/385,687, filed on Sep. 9, 2016.

(51) Int. Cl.
*G02B 6/00* (2006.01)
*G02B 6/44* (2006.01)

(52) U.S. Cl.
CPC ......... *G02B 6/4452* (2013.01); *G02B 6/4454* (2013.01)

(58) Field of Classification Search
CPC ...... G02B 6/444; G02B 6/441; G02B 6/4445; G02B 6/4451; G02B 6/4453; G02B 6/4452; G02B 6/4454; G02B 6/4446; G02B 6/3897; G02B 6/4471; G02B 6/00
USPC ........................................................ 385/135
See application file for complete search history.

(56) References Cited

U.S. PATENT DOCUMENTS

| | | | |
|---|---|---|---|
| 5,717,810 A | 2/1998 | Wheeler | |
| 5,987,203 A | 11/1999 | Abel et al. | |
| 6,819,856 B2* | 11/2004 | Dagley | G02B 6/4452 |
| | | | 385/134 |
| 2005/0105873 A1 | 6/2005 | Reagan et al. | |
| 2005/0281526 A1 | 12/2005 | Vongseng et al. | |
| 2011/0026894 A1 | 2/2011 | Rudenick et al. | |
| 2012/0033926 A1* | 2/2012 | de Jong | G02B 6/3879 |
| | | | 385/135 |

(Continued)

FOREIGN PATENT DOCUMENTS

EP   0 929 199   7/1999

OTHER PUBLICATIONS

International Search Report for PCT/IB2017/055403, dated Dec. 18, 2017, 4 pp.

*Primary Examiner* — Jennifer Doan
(74) *Attorney, Agent, or Firm* — Grant A. Gildehaus

(57) ABSTRACT

A modular fiber frame is disclosed that comprises a generally rectangular frame body, a high density connection module attached to a front side of the frame body, a splitter bracket to hold a plurality of optical splitter modules on the front side of the frame body. All of the splitter connections can be made on the front side of the modular fiber frame, and a preterminated cable harness optically connected to connection ports on a back of the connection module, wherein the connection module includes a protective cover over said connection ports. In some embodiments, the exemplary modular fiber frame can utilize a second preterminated cable harness optically connected to a back of the connection module.

21 Claims, 35 Drawing Sheets

(56) References Cited

U.S. PATENT DOCUMENTS

| | | | |
|---|---|---|---|
| 2013/0094827 A1* | 4/2013 | Haataja | G02B 6/46 |
| | | | 385/135 |
| 2013/0287356 A1* | 10/2013 | Solheid | G02B 6/4452 |
| | | | 385/134 |
| 2013/0287357 A1* | 10/2013 | Solheid | G02B 6/4452 |
| | | | 385/135 |
| 2014/0086545 A1* | 3/2014 | Solheid | G02B 6/4453 |
| | | | 385/135 |
| 2015/0293323 A1* | 10/2015 | Solheid | G02B 6/4452 |
| | | | 385/135 |
| 2015/0338596 A1* | 11/2015 | Solheid | G02B 6/4452 |
| | | | 385/135 |
| 2016/0077296 A1 | 3/2016 | Kowalczyk et al. | |
| 2016/0238812 A1* | 8/2016 | Solheid | G02B 6/4452 |

* cited by examiner

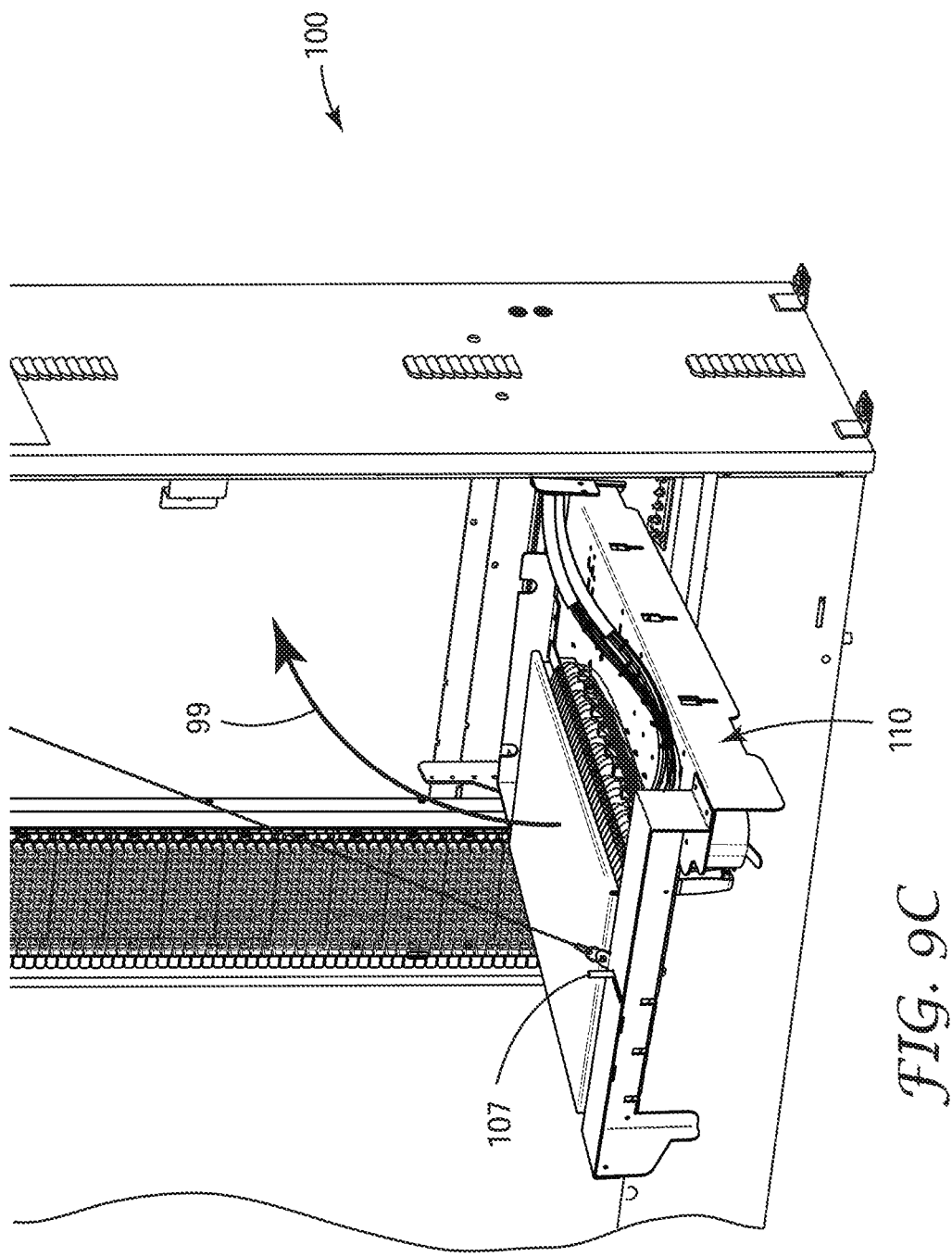

MODULAR FIBER FRAME

FIELD OF THE INVENTION

The present invention relates to a modular fiber frame having a high density connection module. In particular, the exemplary modular fiber frame is configured to retrofit an existing telecommunication cabinet to provide high speed data connections.

BACKGROUND OF THE INVENTION

Telecommunication network designs vary depending on the terrain, the density of the population, existing infrastructure, and other factors. Optical fiber networks in fiber to the end user networks and in the backbone for wireless networks, such as fiber to the antenna (FTTA) networks, are displacing conventional digital subscriber line or DSL copper networks. Installing a completely new optical fiber telecommunication network along beside of the existing coper network can be cost prohibitive due to space or aesthetic reasons. Therefore, network providers are seeking to take advantage of previously acquired rights of way, city pad permitting, cable conduits, vaults, etc. by replacing, the copper wire and connection blocks in existing street cabinets with optical fiber components. In some cases, adding fiber cable management and connection facilities to the existing copper cabinets, operators can take advantage of existing (underutilized or never used) capacity by expanding the existing cabinet capacity within existing right of ways to share both copper and fiber components.

Some service providers have a large embedded base of legacy copper networks that they would like to utilize to add fiber passive optical network (PON) splitter cabinets in densely populated cities or other areas where it is very difficult and time consuming to obtain new rights of way or permits from government or regulatory.

Adding fiber cables and pre-terminated harnesses into an existing copper cabinet risks the potential damage to the fiber optic pigtails or fan outs and also, if not protected, risks the potential to cause tight bends in the fibers that can lead to increased attenuation of the waveguide. Existing copper cross connect cabinets have limited space, possibly less than or equal to 6 inches in depth, to accommodate the optical fiber overlay network so that it can co-exist with the copper frame and cross connect copper termination blocks. Because the existing copper cabinet is already in place, the fiber network components need to be easy to load within the existing copper cabinet, including easy introduction of the fiber optic cables into the existing cabinet.

There is a need in the telecommunication industry for a new deployment model for fiber optic networks that positively impact the quality, speed and cost for the future deployment of high speed networks for fiber to the drop point (FTTdp), fiber to the home (FTTH) and wireless network infrastructure.

SUMMARY OF THE INVENTION

In a first embodiment, a modular fiber frame is disclosed. The modular fiber frame comprises a generally rectangular frame body having a front side and a back side, a high density connection module attached to the frame body, a splitter bracket configured to hold a plurality of optical splitter modules disposed on the front side of the frame body, wherein all connections to the plurality of optical splitter modules are made on the front side of the modular fiber frame, and a preterminated cable harness optically connected to connection ports on a back of the connection module, wherein the connection module includes a protective cover over said connection ports. In some embodiments, the exemplary modular fiber frame can utilize a second preterminated cable harness optically connected to a back of the connection module. In some embodiments, the exemplary modular fiber frame has a second connection module attached to the frame body. In some embodiments, a jumper storage shelf can disposed along a top edge of the frame body.

In a second embodiment, a modular fiber frame is disclosed. The modular fiber frame comprises a generally rectangular frame body having a front side and a back side and having a high density connection module integrally formed on apportion of the frame body, a splitter bracket configured to hold a plurality of optical splitter modules disposed on the front side of the frame body, wherein all connections to the plurality of optical splitter modules are made on the front side of the modular fiber frame, and a preterminated cable harness optically connected to connection ports on a back of the connection module, wherein the connection module includes a protective cover over said connection ports. In some embodiments, the exemplary modular fiber frame can utilize a second preterminated cable harness optically connected to a back of the connection module. In some embodiments, the exemplary modular fiber frame has a second connection module attached separately to the frame body to increase the connection density of the modular fiber frame.

The present invention also includes a new method of installing a modular fiber frame in a telecommunication cabinet. A generally rectangular frame body and a connection module assembly comprising a preterminated cable harness optically connected to a back side of a high density connection module are delivered to the job site. The frame body is places face down on a work surface on stand-off supports extending from the front side of the frame body. The connection module assembly is mechanically attached to a back side of the frame body. A second end of the cable harness inserted through a conduit to a remotely located splice closure where it is connected to the network cables. Next, the frame body is inserted into an empty bay in the telecommunication cabinet and locked in a vertical position. Finally, a plurality splitters in a splitter bracket on the front side of the frame body and the splitter fibers are routed and connected to the connection module to establish service or to a jumper storage shelf disposed along its top edge of the frame body.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIGS. 9A-9E show the assembly of the modular fiber frame of FIGS. 1A-1E into a telecommunications cabinet.

Figure 1A:
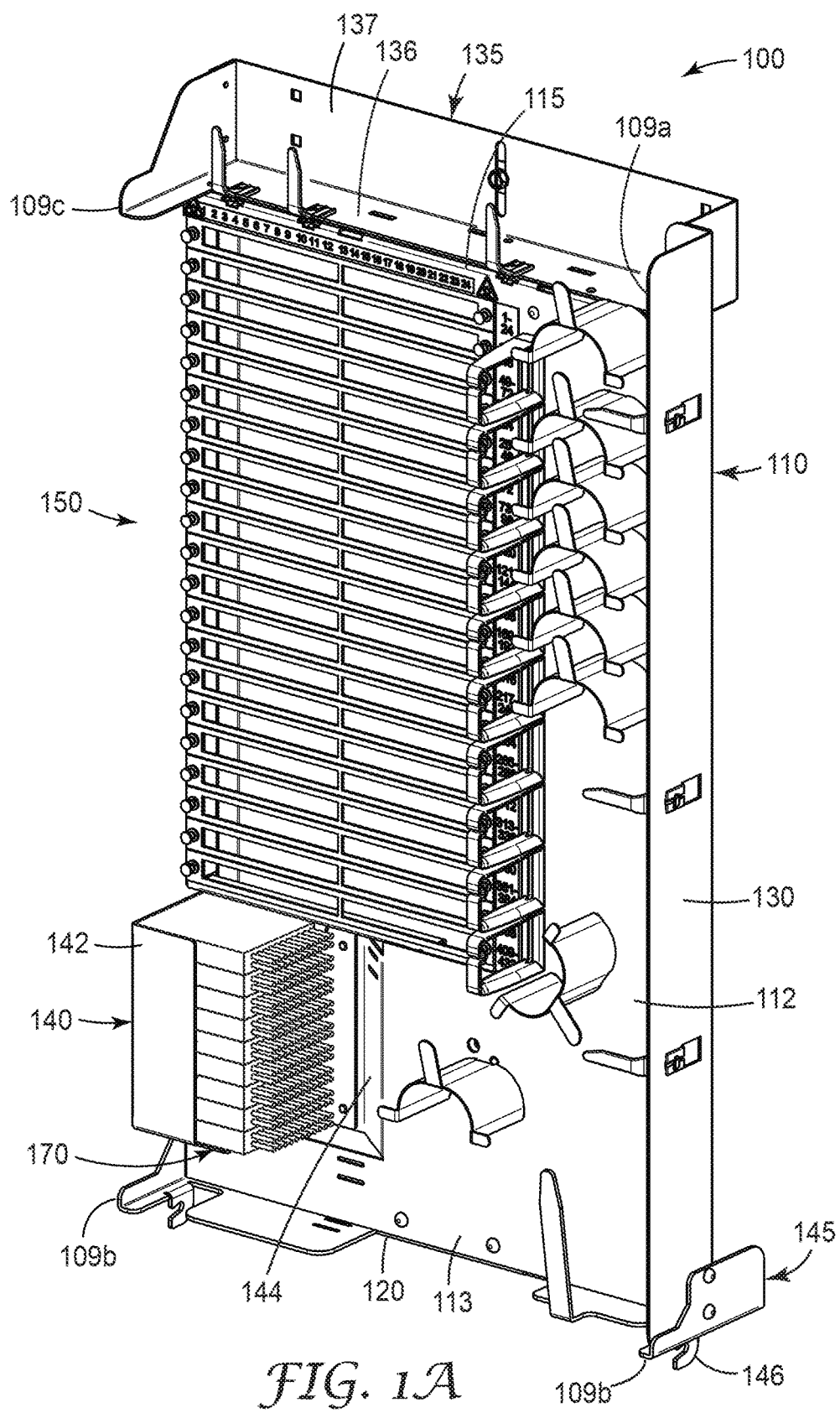
FIGS. 1A-1E are five views of an exemplary modular fiber frame according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following detailed description of the preferred embodiments, reference is made to the accompanying drawings, which form a part hereof, and in which is shown by way of illustration specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

The invention described herein, condenses a traditional PON fiber frame with feeder, distribution, and dedicated pass through ports into a modular assembly that can be disposed in a conventional underutilized DSL network cabinet. For example, the 3M 4220, and 4230 passive outside plant (OSP) cabinet products, available from 3M Company (St. Paul, Minn.) have been utilizing copper Self Strip and Quick Connect System frames/blocks for many years. It is estimated that over 250,000 of these cabinets exist in one service provider's network alone. When many of these cabinets were installed they were sized to allow service expansion in the future. In many cases, the expansions in service experienced did not require the entire cabinet, leaving unused space in the cabinets.

The present invention seeks to take advantage of this unused space in these legacy copper cabinets to overlay an optical fiber network. This approach will reduce the amount of time required to install and provide service to customers because the service provider's permitting and network design process can be streamlined. It can take many months to get approval from municipalities or other organizations for new telecommunication network infrastructure. This approval process can vary greatly from one place to another and from one organization to another and can often times represent a moving target with respect to the requirements for the approval process.

Another benefit of utilizing the same footprint as the legacy copper networks, product designs for network expansion, rehab, and other necessities are already complete of the copper network that can be readily adapted for an OSP fiber overlay network. Municipalities and local governing bodies prefer that the telecommunications company not add additional bulky, above ground infrastructure that block views and can gather graffiti and become an eyesore. The ability to share existing copper OSP cabinets utilizing a modular fiber frame of the present invention placed inside allows for increased speed of fiber network deployment, better esthetics and network deployment savings.

In one aspect, the exemplary modular fiber frame of the present invention has the same connection density as the legacy copper frames of the same size. In an alternative aspect, the exemplary modular frame of the present invention can have a higher connection density than a legacy copper frames of the same size, providing added savings to the telecommunication service provider.

A first embodiment of an exemplary modular fiber frame 100 is shown in FIGS. 1A-1E. Modular fiber frame 100 includes a frame body 110 and a connection module 150. The frame body comprises a flat face portion 112 has a generally rectangular shape having four edges: a top edge 115, a bottom edge 120, and two side edges 125, 130. The face portion has a front side (the first major surface) 113 and a back side 114 (the second major surface disposed opposite the first major or the front side). One or more of the edges can be bent so that it forms an L-shape with the face portion to provide structural support for the frame body as well as aiding in containing and protecting the optical fibers routed on the front side of the face portion. In the embodiment shown in FIG. 1A the second side edged 130 is bent so that it extends generally perpendicular to the face portion of the frame body.

Figure 4A:
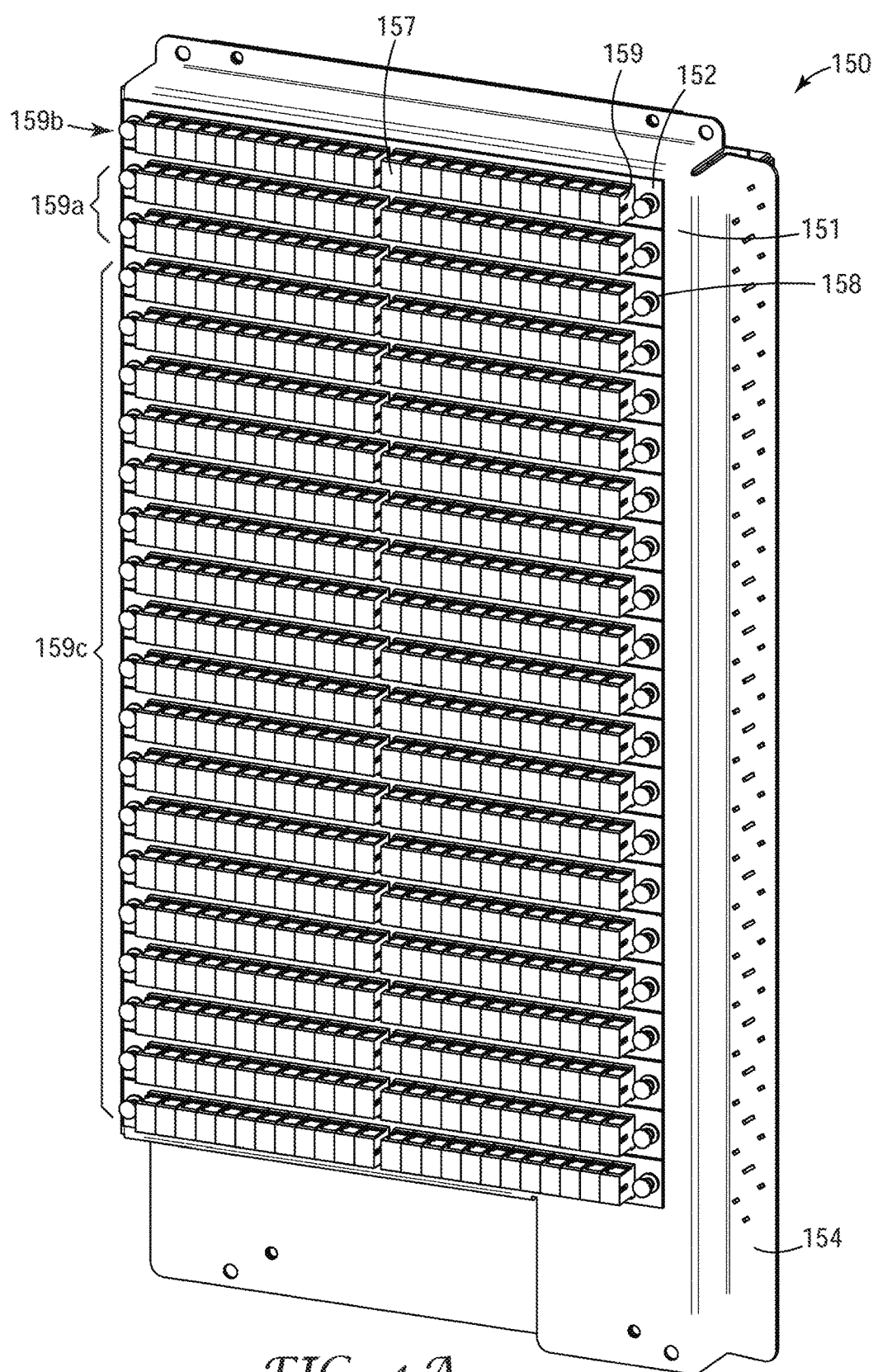
FIGS. 4A-4D are four views of an exemplary connection module usable in the modular fiber frame according to an embodiment of the present invention.
Figure 4B:
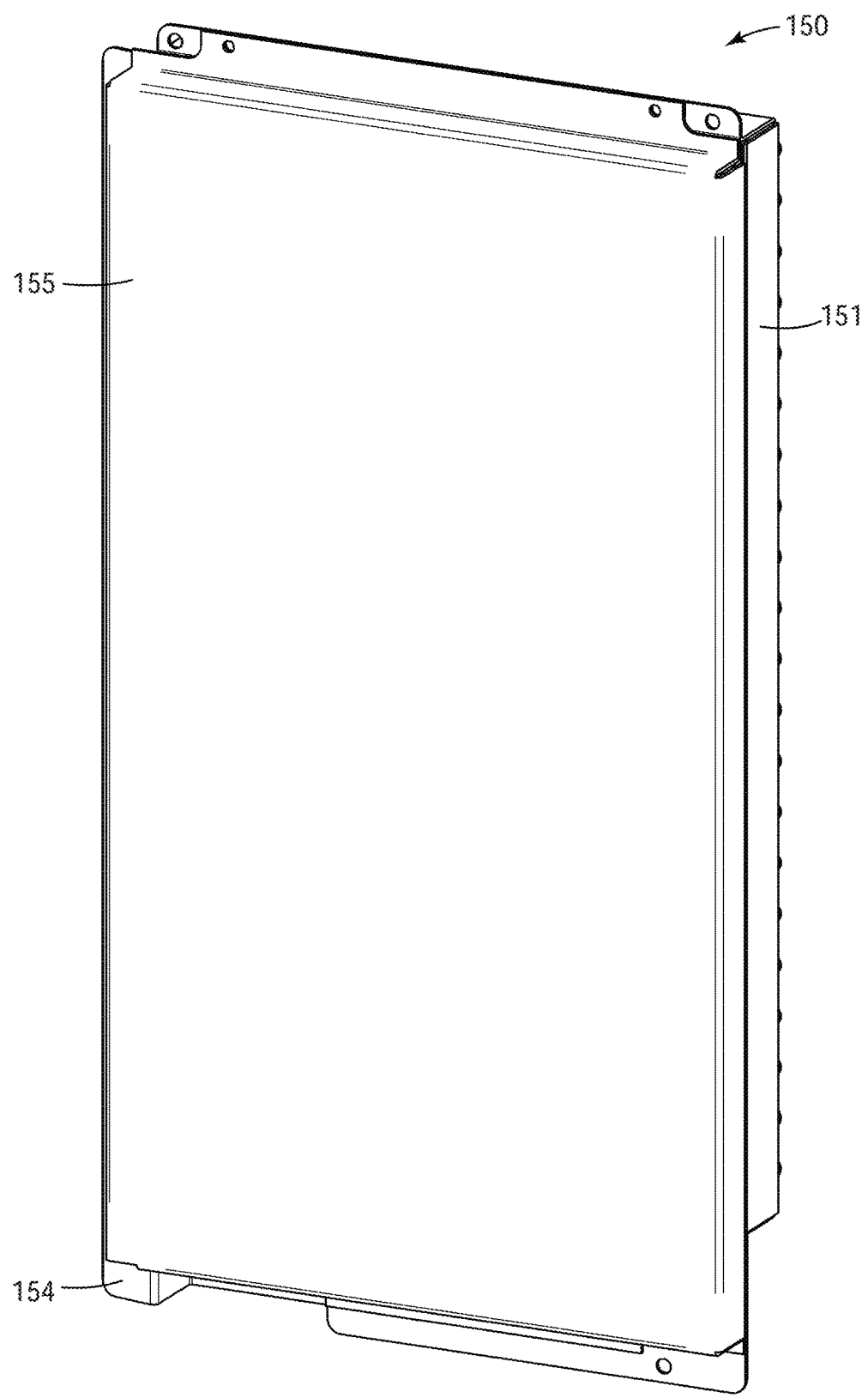

Frame body 110 includes a splitter bracket 140 disposed adjacent to first edge 135 and below connection module 150. Splitter bracket 140 is configured to hold a plurality of optical splitter modules 170 in a horizontal orientation when the frame body is mounted vertically in a telecommunication cabinet as shown in FIG. 4B. In one embodiment, the optical splitter modules have an optical splitter (not shown) in a hardened protective housing 172. Size and placement of the optical splitter modules enables the modular fiber frame to support necessary quantity of splitters to serve defined distribution area and connection module port count density. The optical splitters can have a range of optical split ratios including 1:2, 1:4, 1:8, 1:16, 1:32, 1:64 or potentially other ratios. The optical splitters may be of additional inputs as well to allow for redundant service inputs, for example, 2:32 or 2:64 splitters. It may also be that WDM module components of similar shape and size be placed within the same cabinet to allow for wavelength splitting of the signals fed to the cabinet. In some embodiments, the exemplary modular fiber frame enables the use of a plurality of optical splitter modules having a uniform length of fiber pigtails by the efficient cable management scheme employed.

Referring to FIGS. 1A and 2C-2E, splitter bracket 140 has a base 141 and a side wall 142 that extends from the frame body wrapping around the back and partially up the side of the optical splitter modules when they are installed in the splitter bracket. The front side of the splitter (i.e. the side where the splitter pigtails 174 enter and leave protective housing 172) can face toward second edge of frame body 110. In an exemplary aspect, splitter bracket 140 can be partially recessed into the frame body. In this case the splitter bracket can include a ramp portion 144 to facilitate placement of the optical splitter modules into the fiber bracket. A lip 143 is formed at the bottom of ramp portion 144 to retain the optical splitter module in the splitter bracket.

Figure 3:
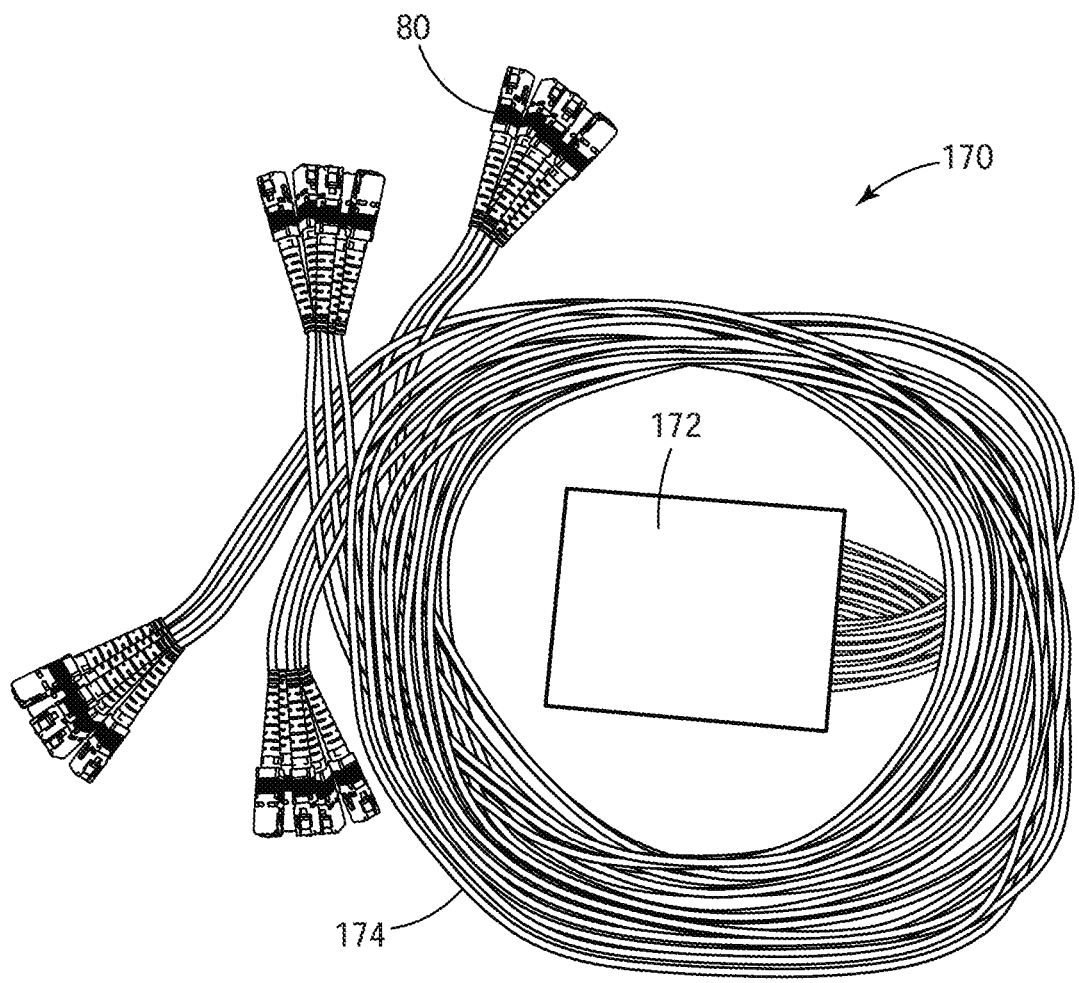
FIG. 3 shows an exemplary ruggedized splitter that can be used in conjunction with the modular fiber frames of the present invention.

In an exemplary embodiment, the optical splitter modules used with the exemplary modular fiber frame 100 can be ruggedized optical splitter modules as shown in FIG. 3. The optical splitter is disposed in a protective housing 172. The optical splitter can be configured to split the optical signal from one or two input fibers into a plurality of output fibers. The input fibers attach to the input side of the optical splitter and a plurality of output optical fibers are attached to the output side of the optical splitter. The exemplary optical splitter module can be a 1×16, 1×32, 2×32, 1×62 or a 2×64 optical splitter module. Each of the optical fibers can be inserted through a protective sleeve and terminated with an optical fiber connector 80 such as an SC UPC format connector and SC APC format connector or an LC format connector to create splitter pigtails 174 (e.g. input fiber pigtails and output fiber pigtails which extend through the wall of the protective housing. The optical fiber connectors 80 on the ends of the splitter pigtails will connect into optical fiber connector adapters 159 in connection module 150 (FIG. 4A). In an exemplary aspect, the protective sleeve of the input splitter pigtails/fibers can be a different color from the protective sleeve of the output splitter pigtails/fibers. Alternatively, the input splitter pigtails/fibers can be labeled with an adhesive backed labels that is adhered to the protective sleeve adjacent to the terminal optical fiber connector. In yet another aspect, a label can be directly printed on the protective sleeve of the input splitter pigtails/fibers.

Alternatively, the splitter bracket can have an open box shape where the open end faces toward second edge. The front wall of the splitter bracket can be shorter than the back wall (of said bracket to facilitate placement of the optical splitter modules into the bracket. In an exemplary aspect, the splitter bracket can partially extend through an opening through the frame body to help maintain the compact size of modular fiber frame 100.

In an alternative aspect, a conventional optical splitter modules with optical adapters for both inputs and outputs and fiber patch cords can be used in place of the ruggedized optical splitter module. In yet another aspect, the input pigtail may contain a multi-fiber ribbon that enters the optical splitter module having a fiber fan out device inside that divides the fiber ribbon into individual fibers which are then place in protective sleeves and connectorized. In this later embodiment, the optical splitter module physically splits the fiber ribbon into its individual fibers with a fan out device in place of the optical splitter. In another embodiment, the optical splitter can be wavelength division multiplexing (WDM) device.

Modular fiber frame 100 can include a jumper storage shelf 135 disposed along the top edge 115 of frame body 110 as shown in FIGS. 1A-1D and 2A-2B. The jumper storage shelf includes a landing surface 136 that can be used to store connectorized splitter pigtails 174 prior to making a service connection to the proper port on the connection module.

In the exemplary embodiment shown in FIGS. 1A-1D and 2A, the jumper fiber storage shelf 135 has a rear partition 137 to aid in the retention of the unused splitter pigtails 174. There is at least one slot or opening 138 through the back partition that can be used to secure or lock modular fiber frame 100 into position in the telecommunication cabinet in which it is installed with a locking bolt 107 inserted through slot 138. The fiber frame is designed so that there is no need for the field technician to access the back of the modular fiber frame once it has been installed in the cabinet for routine maintenance, establishing service connections or for cleaning of optical fibers plugged into the backside of the optical fiber connector adapters held by the connection module. All of these activities can be performed from the front side of the exemplary modular fiber frame.

Figure 2A:
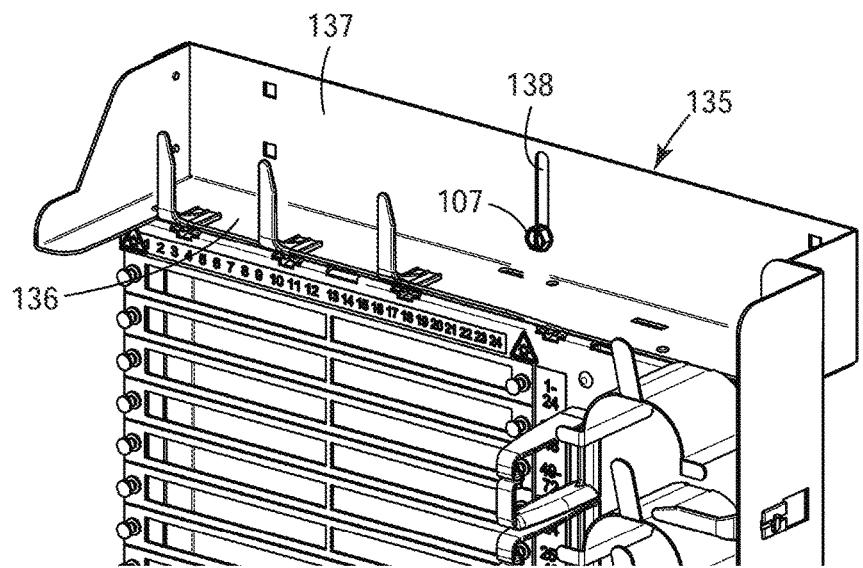
FIGS. 2A-2F are a variety of detail views showing the features of the modular fiber frame of FIGS. 1A-1E.
Figure 2B:
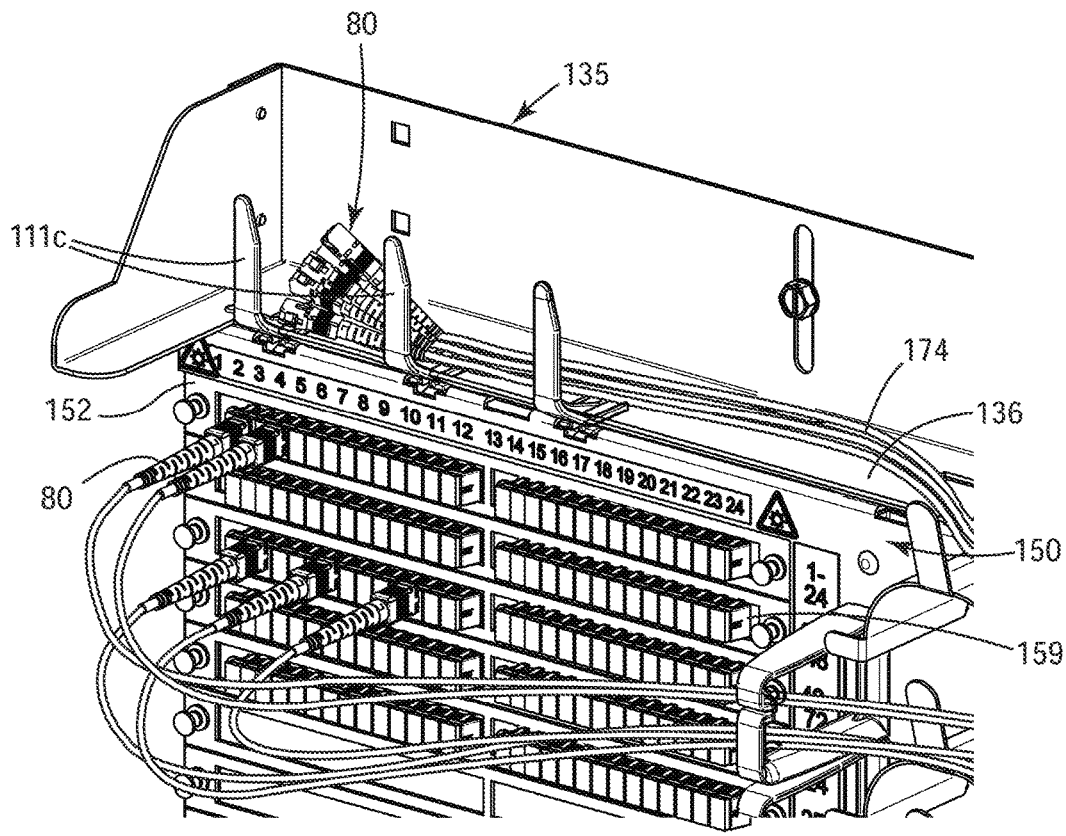

Due to the limited space allotted to the fiber optic network overlay, all splitter pigtail fiber management can be arranged on the front face of the frame body 110 in conjunction with a variety of cable management structures, such as cable management fingers 111a-111c, cable management rings 111d and bend control arches 111e (collectively 111). The fiber management structures allow easy access to and placement of the splitter pigtails 174 as they are routed to the appropriate service address port (SC adapter) in the exemplary modular fiber frame 100. Cable management fingers 111a are L-shaped fingers that extend from the bottom edge 120 provide containment and management of slack loops in the splitter pigtails in a slack control region of the exemplary modular fiber frame 100 as shown in FIG. 8B. Fingers 111b extend over the frame body from the second edge 130 to manage the splitter pigtails as they are guided vertically along the second edge of the exemplary modular fiber frame. Fingers 111c extend upward from the top edge 115 to retain unused splitter pigtails on the jumper storage shelf 135 as shown in FIG. 2B. Cable management rings 111d support and organize the splitter pigtails adjacent to connection module 150. Each cable management ring can be associated with a set area on the connection module (i.e. to specific rows of optical fiber connector adapters). Finally, bend control arches 111e are used in the splitter pigtail routing path where there is a change of direction to prevent violating the minimum bend radius of the optical fibers in the splitter pigtails.

Referring to FIGS. 1A-1D and 2C, modular fiber frame 100 includes a frame support 145 attached to the bottom edge 120 of the frame body 110 by mechanical fasteners such as a rivets, by a structural adhesive, by welding of by a combination thereof. The frame support includes a pair of mounting hooks 146 extending from the lower surface of the frame support opposite the frame body. The mounting hooks can engage with support rods in the telecommunication cabinet into which the modular fiber frame is installed.

In an exemplary aspect, the frame body can have a plurality of stand-off supports which act as legs to elevate the frame body above the ground or other horizontal preparation surface such as a table during installation or in the event that catastrophic damage is done to the cabinet in which the modular fiber frame is installed requiring reskinning of the cabinet. The stand-off supports are tall enough so that a fully populated frame body and connection module can be placed front side of the frame body down toward the ground without the ground contacting any of the splitter pigtail connectors that are attached to the connection module touching the ground. The stand-off supports (collectively referred to by reference number 109) for the exemplary modular fiber frame shown in FIG. 1A include the rim 109a of the bent portion of second edge 130 of frame body 110, the forward facing extension 109b at each end of frame support 145 and the forward facing extension 109c at the first edge of the jumper storage shelf.

Figure 2C:
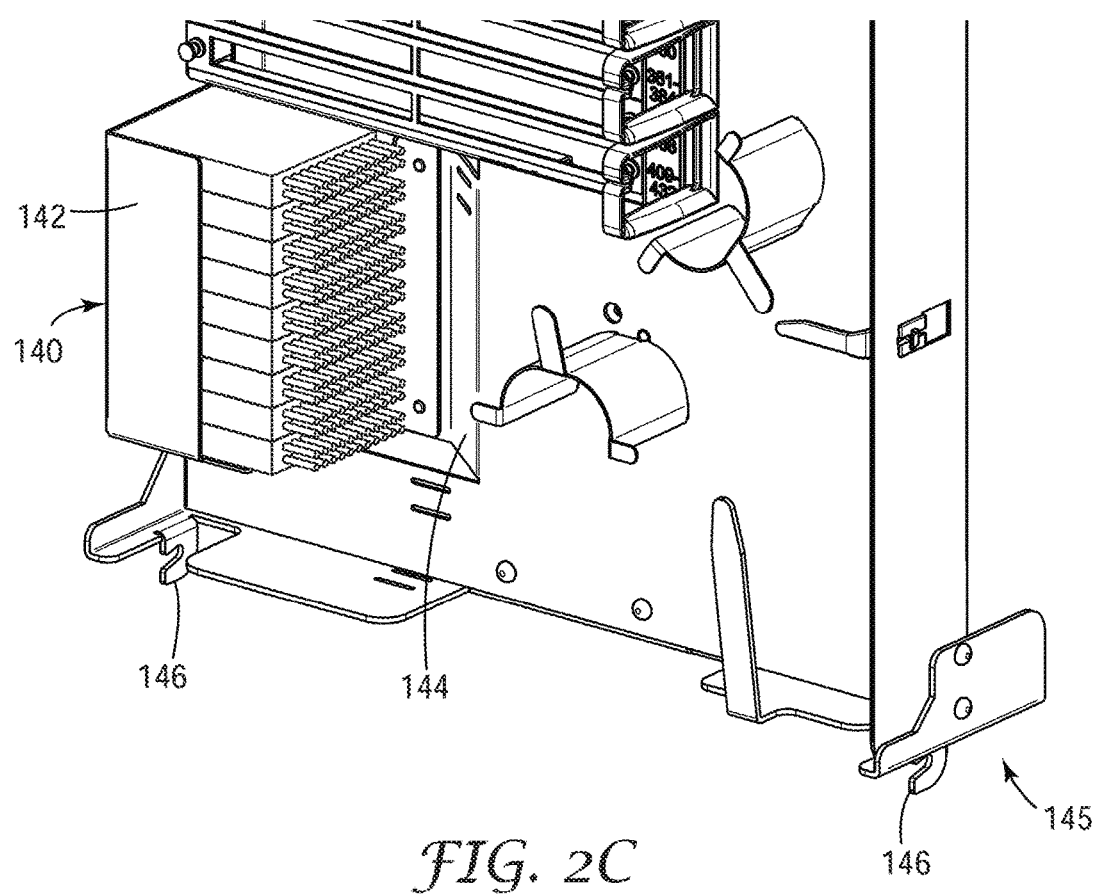
Figure 2D:
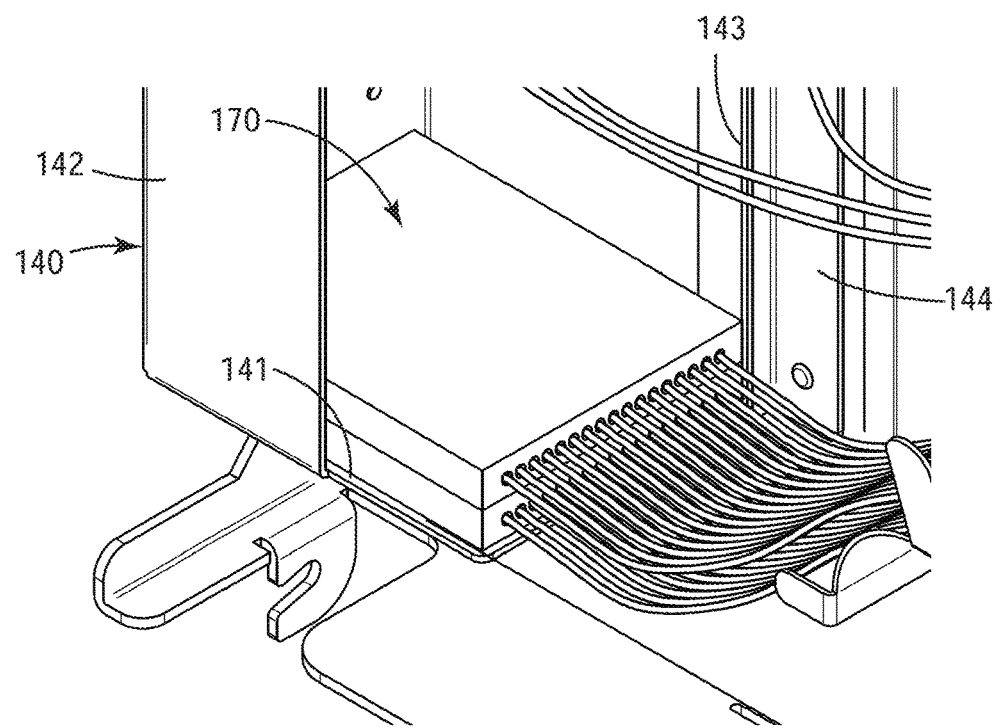

The connection module 150 is a separate component that can be attached to frame body 110. In particular, connection module 150 fits into a cut-out portion 106 in the frame body. The connection module is attached to the frame body from the back side where it is held in place by mechanical fasteners such as nut and bolt fasteners (FIG. 2C).

Connection module 150, shown in FIGS. 4A-4D includes a base plate 151 having a front face. The base plate can be made of folded sheet metal. The base plate holds a plurality of removable connection plates 152, wherein each connection plate holds a plurality of optical fiber connection adapters 159.

The connection module further a protective cover 155 attached to the back of base plate 151 to protect the connection of the optical fibers from the cable harness where they connect to the rear port of the optical fiber connector adapters 159 of the connection module from accidental tight bends of these fibers during installation of the exemplary modular fiber frame. Once the cable harness connectors has been attached to the connection module, the connection module is sometimes referred to as a connection module assembly.

Figure 5A:
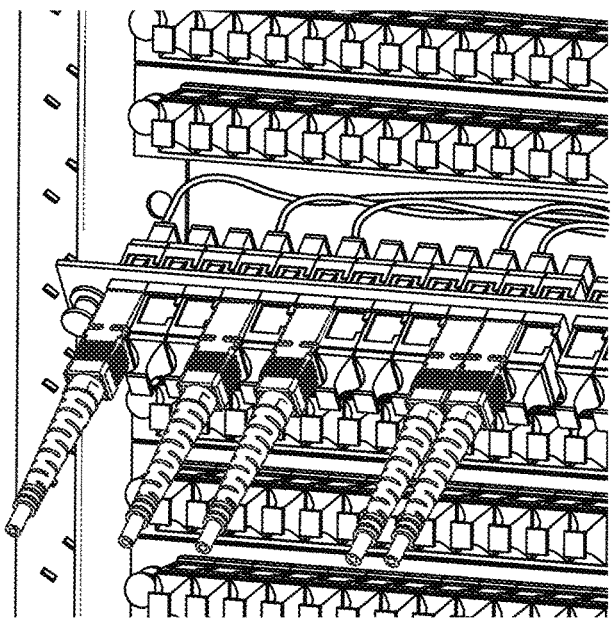
FIGS. 5A and 5B show the removal of a connection plate in the connection module of FIGS. 4A-4D in order to clean the optical fiber connectors on the backside of the connection modules base plate.
Figure 5B:
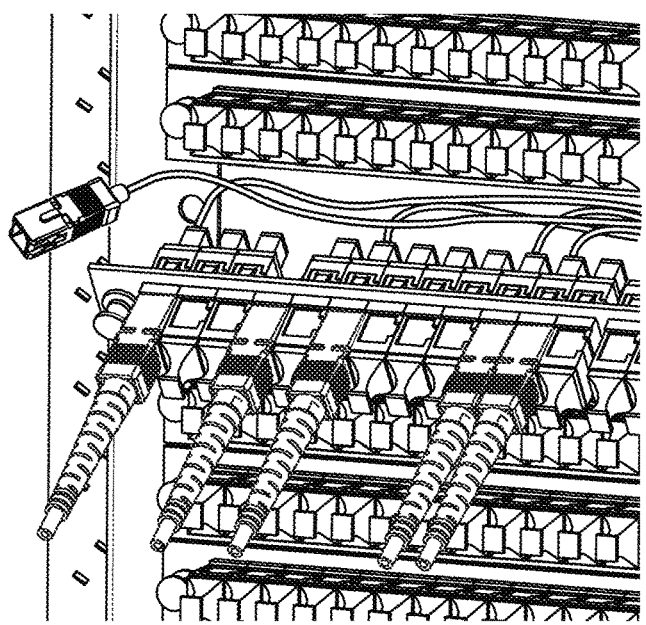

Base plate 151 has the form of a frame surrounding an open central region. Along the two vertical edges 151a of the open central region are a plurality of regularly spaced apart openings 151b (FIG. 5A) which can be configured to enable the attachment of the connection plates 152 to the base plate. The optical fiber connector adapters 159 are disposed in rows, each row of which is held by a connection plate 152 which can be attached to the base plate by locking pins 158 disposed at either end of the connection plate on the front side of the connection module. The locking pins on the connection plate engage with one of the openings on each side of the open central region of the base plate. Because the mounting plates are attached to the front side of the connection module, a connection plate such as connection plate 152 can be removed from the connection modules to allow cleaning of the optical fiber connectors of the pre-connectorized cable harness to be cleaned even after the modular fiber frame 100 is secured into the telecommunication cabinet as shown in FIGS. 5A and 5B. There is no need to move the modular fiber frame to get access the rear side connection, thus providing a more stable connection field.

The optical fiber connector adapters 159 can be standard format that are configured to mate a pair of standard format optical fiber connectors such as LC optical fiber connectors or SC optical fiber connectors. In the exemplary embodiment shown in FIGS. 1A-1C, the connection module is supplied with 480 SC optical fiber connector adapters arranged in twenty rows on twenty connection plates 152, 24 optical fiber connector adapters can be secured in each connection plate.

In an alternative embodiment, the open center region of the base plate can be bisected by a plate member (not shown) having a plurality of regularly spaced apart openings along both vertical edges that correspond to the regularly spaced apart openings along the vertical edges of the central opening divide the open center into two separate open spaces and allow the attachment of two connection plates disposed side by side for each row of optical fiber connector adapters.

Dust caps 157 can be disposed in the front port of each of the optical fiber connector adapters 159 in the connection module 150 until a service connection is made. In one aspect, the dust caps can be suitably transparent to allow the filed technician to note if the line behind the dust cap is alive, while suitably scattering any light being transmitted through the live line to insure that it can be viewed safely. Alternatively, the dust caps may be permanently attached with a form of hinged cover that can swing open to allow a fiber connector to be inserted and swing shut when the fiber connector is removed. Additionally, the connection ports may allow for the placement of another component prior to connection of the splitter pigtail connector. These components may include an attenuator or a wavelength filter device which may block selective wavelengths of light fed to the splitter input from the feeder network fiber.

The optical fiber connection module 150 provides interconnection between a relatively few feeder fibers and a much larger number distribution fibers that go to the end users. This structure is accomplished through one of the optical fiber optical splitter modules 170 mentioned previously. The feeder fibers are connected to the input splitter fibers/pigtails of the optical fiber optical splitter module and the distribution fibers are connected to the output splitter fibers/pigtails of the optical splitter modules; each of which is connected by a pair of optical fiber connectors mated in an optical fiber connector adapter. The distribution and feeder fibers are disposed in the at least on cable harness attaches to the back port of the optical fiber connector adapters by optical connectors 70. The splitter pigtails are attached to the front port of the optical fiber connector adapters by optical connectors 80.

Optionally, the service provider may want to provide priority high data rate lines to some customers willing to pay for a higher bandwidth or dedicated fiber. To enable this service, the modular fiber frame can be provided with a plurality of pass through connections which can be directly patch one of the feeder fibers to a distribution fiber through the use of a short jumper cable (not shown.

As mentioned previously, the optical fiber connection adapters 159 are disposed in rows. The feeder connections (i.e. feeder connector adapters 159a) and optional pass through connections (i.e. pass through connector adapters 159b) can be disposed at the top of the connection module, while the distribution connections (i.e. distribution connector adapters 159c) are located below the feeder connections and the pass through connections.

For example, modular fiber frame 100 is configured to have a distribution connection capacity of 432 SC format connections. The 432 distribution connection capacity can include 432 distribution connections, 48 feeder connections and 24 pass through connections and utilizing a first and a second cable harnesses 60a, 60b, shown for example in FIGS. 7A-7C. The pass through connections can be disposed in the first row of optical fiber connector adapters, the feeder connections can be disposed in the second and third rows of optical fiber connector adapters, and the remaining rows of optical fiber connector adapters are for the distribution connections.

Figure 4C:
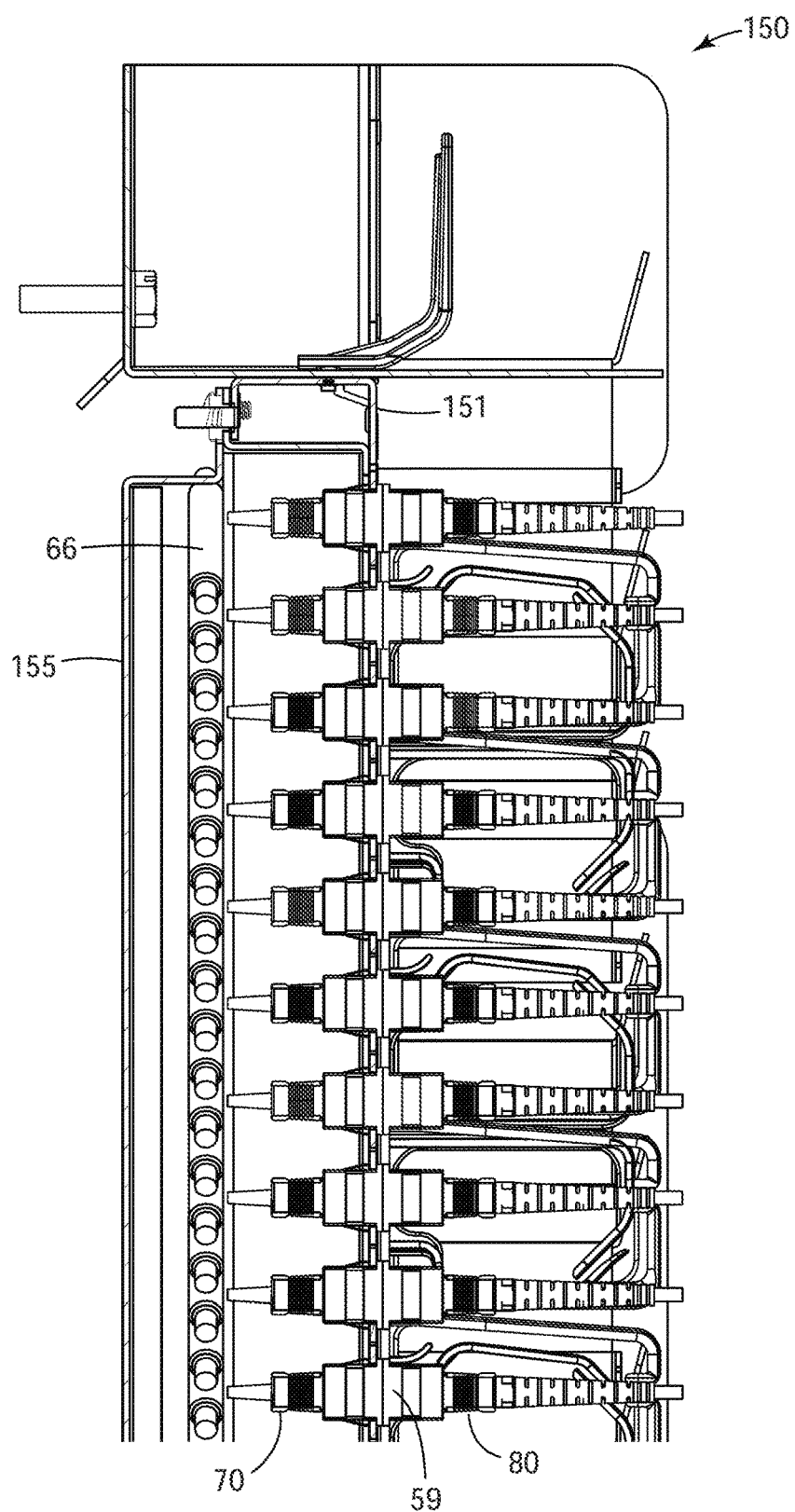
Figure 4D:
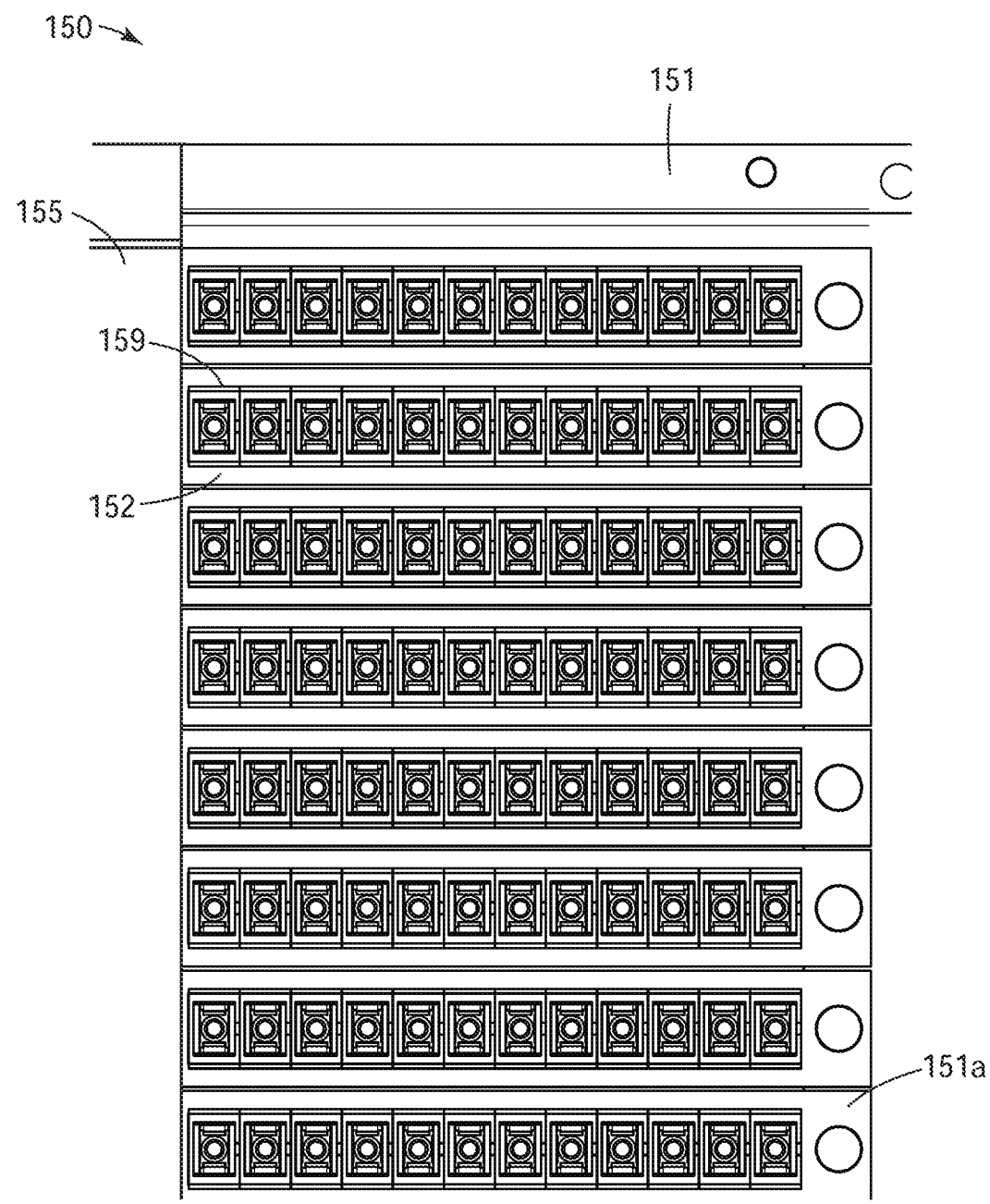
Figure 7A:
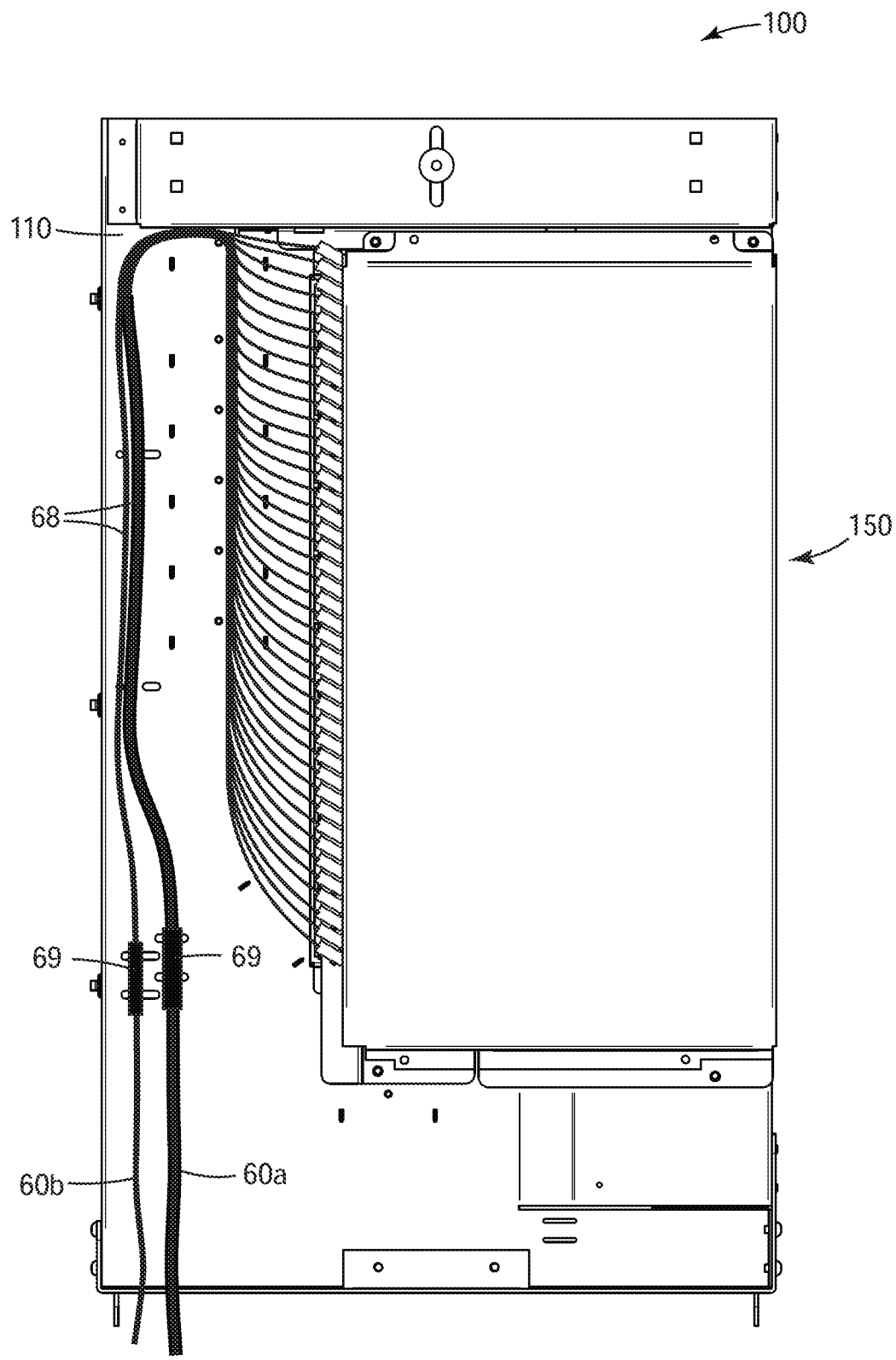
FIGS. 7A-7C are three views showing a first and a second cable harnesses secured to the back side of the frame body of the exemplary modular fiber frame according to an embodiment of the present invention.
Figure 7B:
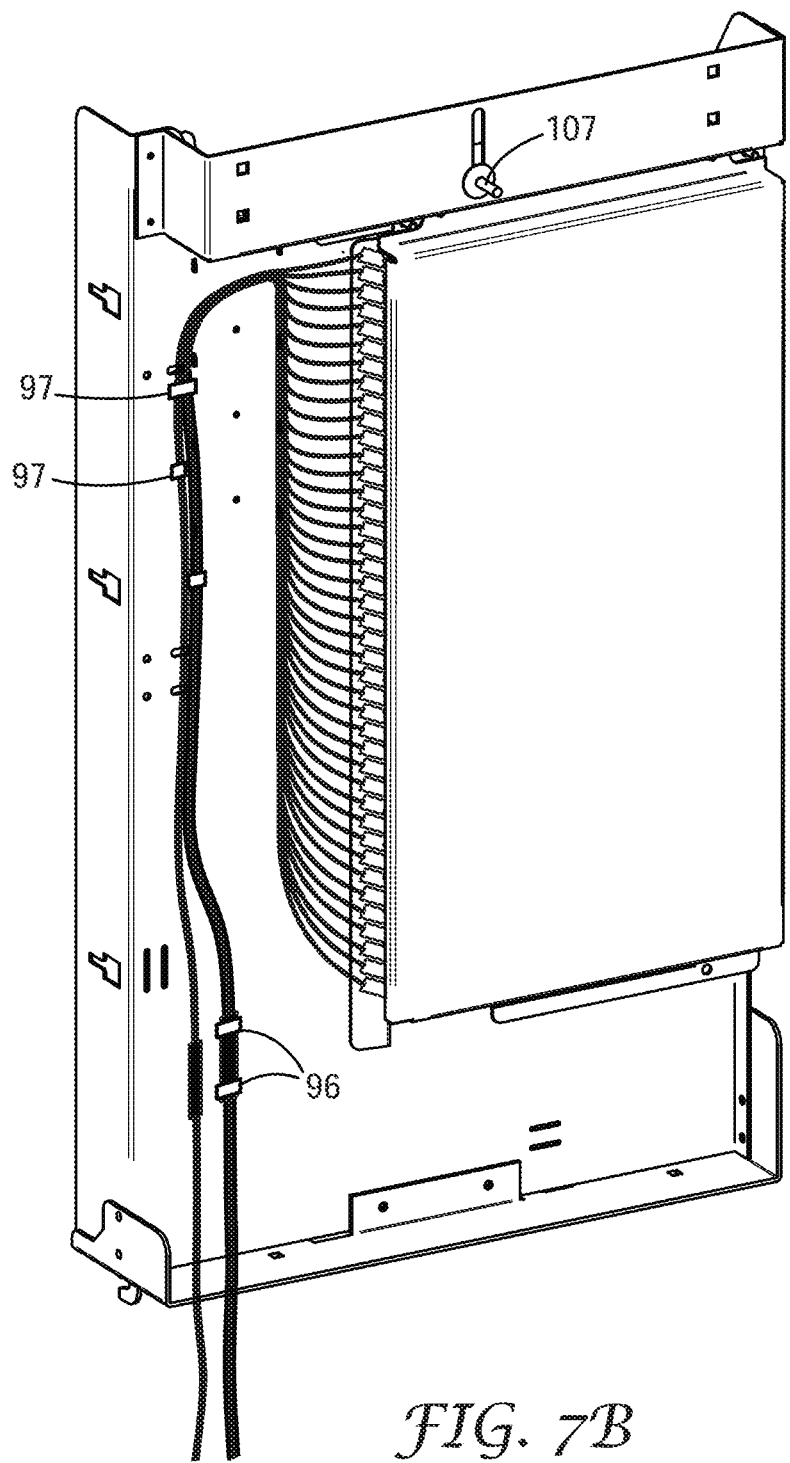
Figure 7C:
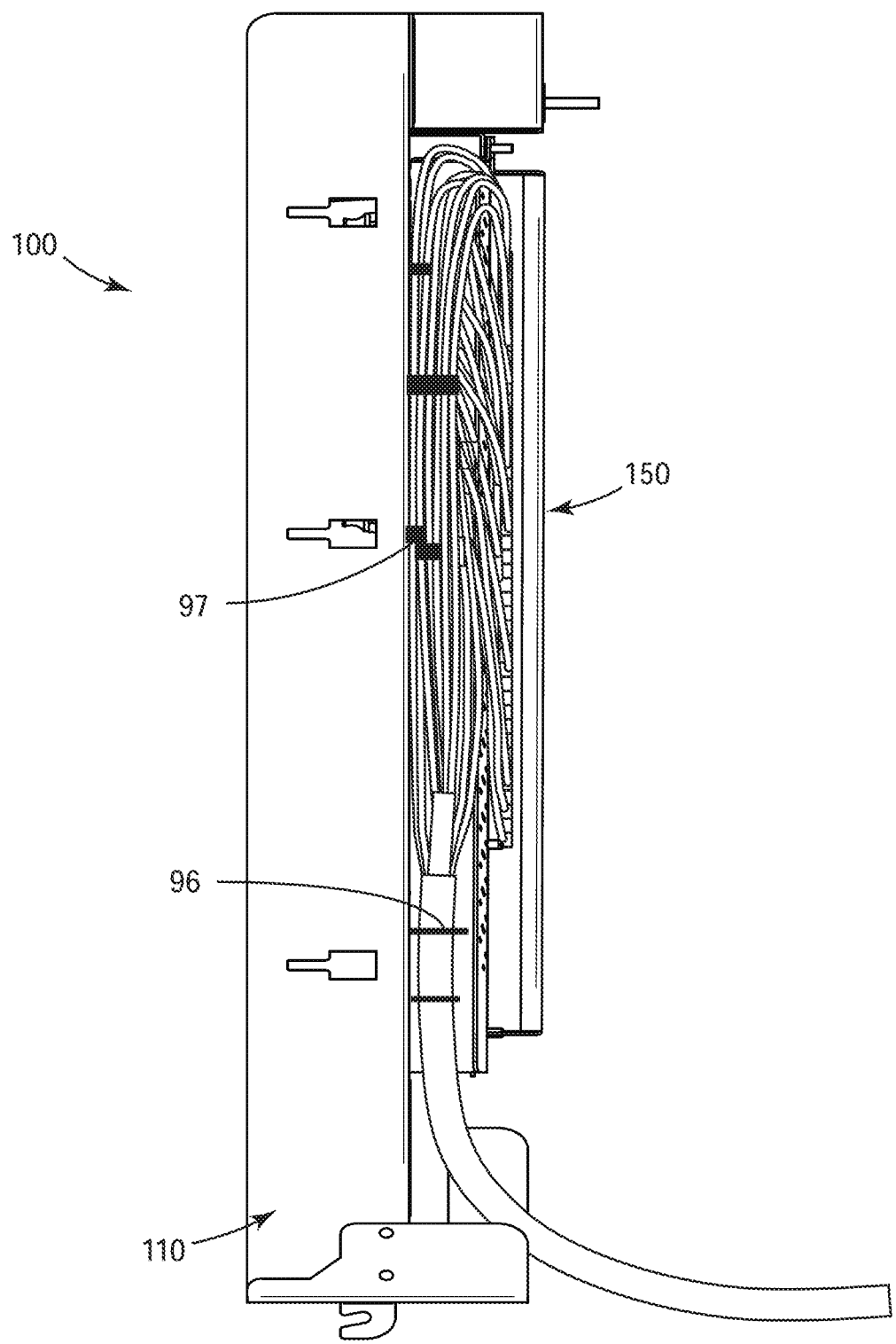

The first cable harness can be a 432 fiber cable harness 60a and the second cable harness 60b can be a 72 fiber cable harness for the feeder and pass through connections, shown for example in FIGS. 7A-7C. The cable harnesses will be disposed on the backside of the modular fiber frame and be connected to the backside of the connector adapters in the connection modules (FIGS. 4C and 5A-5B).

In an alternative embodiment, the cable harness can has a ribbon based high density connection such as a high density optical fiber connector(s) and/or high density splice device. The high density connection can be located as a base of the connection module or on the back face of the frame body so as to avoid having a long preterminated cable harness at the time of initial installation.

In an exemplary aspect, the 480 SC port connection module can have dimensions of about 18 in. by about 11 in. by about 2 in., creating a volume for the rear portion SC connectors (from centerline of adapters) of about 400 cubic inches. The total volume of 480 SC port connection module including area for splitter pigtails (on the front side of the connection module is less than about 830 cubic inches. When divided by the total number of optical fiber connector adapters, this volume equates to about 1.65 cubic inches per SC connector pair joined by an optical fiber connector adapter. Ultra-bend insensitive fiber could further reduce this volume to less than about 725 cubic inches, or 1.44 cubic inches per SC connector pair.

Figure 6:
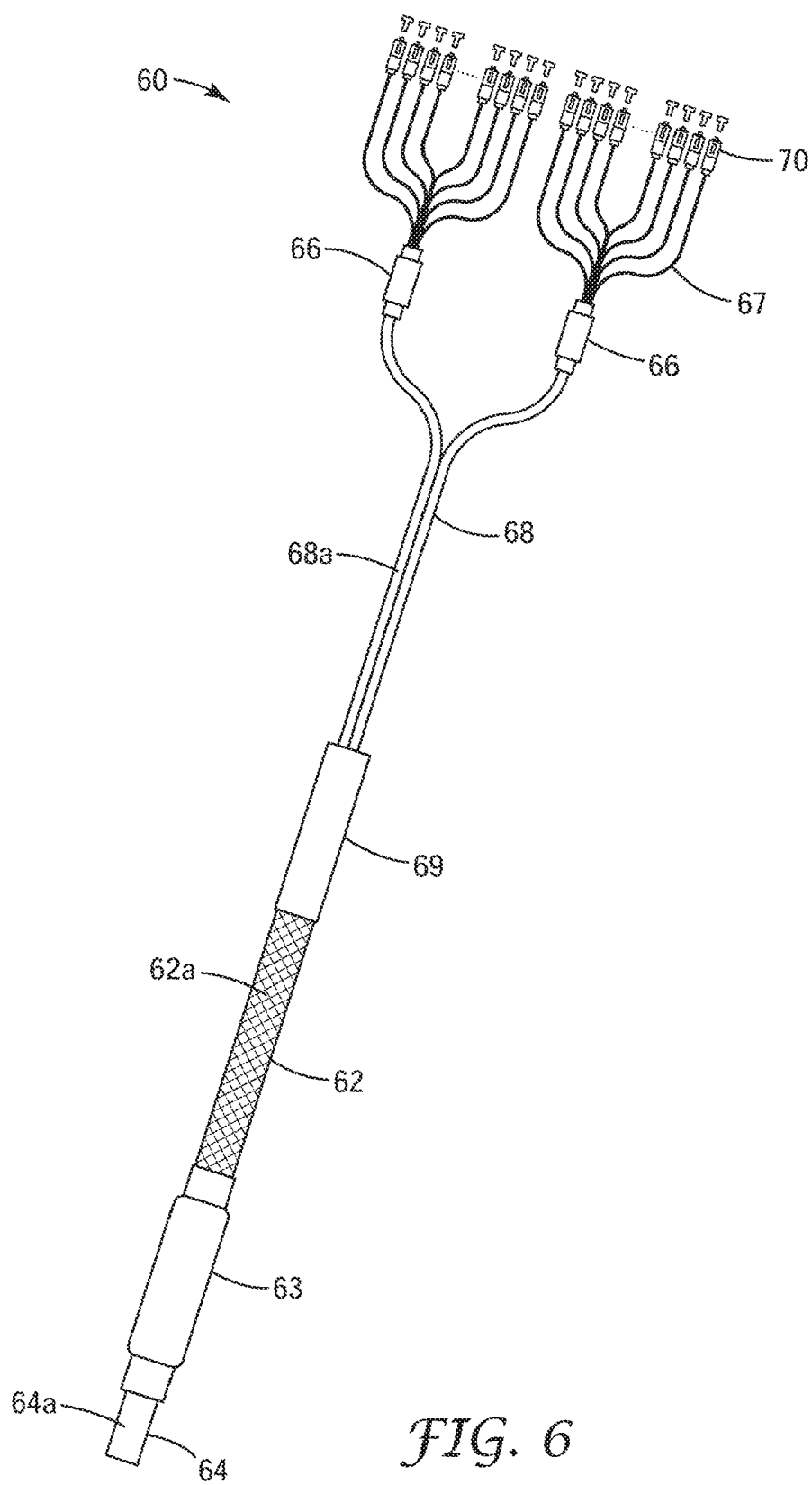
FIG. 6 is a schematic representation of a cable harness used in conjunction with the modular fiber frames of the present invention.

FIG. 6 is a schematic diagram of an exemplary cable harness 60 which be prepared from an outside plant fiber cable section. In one aspect, a section of 48 fiber outside plant fiber cable containing 4-12 fiber ribbons can be used to make the optical fiber cable harness, such Dry Prysmian FusionLink™ Ribbon Central Tube Cable available from Prysmian Group (Lexington, S.C.). Other high count optical fibers can be used to prepare optical fiber cable harness 60 depending on the size of the connection module being used. Generally, these high fiber count outside plant fiber cables are generally stiff. The protection of the jacked cable can be utilized in areas where the fibers could be subject to damage from external forces and where there is sufficient space to accommodate the cable bend radius. However, a more flexible optical fiber cable harness is generally desired when considering slack storage and routing the cable harness through an existing telecommunication cabinet.

Exemplary optical fiber cable harness 60 can include a plurality of fiber ribbons (not shown); each fiber ribbon having a plurality of optical fibers. Each of the fibers once separated from the fiber ribbon can have an optical fiber connectors 70 mounted on the terminal end thereof. In an exemplary aspect, the optical fiber connectors can be standard format optical fiber connectors such as LC optical fiber connectors or SC optical fiber connectors. The optical fiber cable harness can include several sections including a high fiber count semi-rigid protected portion 64 (i.e. a portion of the original sheathed outside plant cable), a fiber breakout device 63, a high fiber count flexible fiber ribbon routing portion 62, and a plurality of low fiber count fiber ribbon protected portions 68, a fan-out device 66, individual optical fibers disposed in 900 micron buffer tubes 67.

The breakout device is a transition between the high fiber count semi-rigid protected portion 64 and the high fiber count flexible fiber ribbon routing portion 62. Each of the low fiber count fiber ribbon protected portions 68 can include either 12-24 individual 250 micron fibers or one or more fiber ribbons having a total fiber count of 12-24 individual fibers (i.e. for example, up to 2-12 fiber ribbons; 3-8 fiber ribbons etc.) disposed in a protective jacket. The fan-out device 66 is disposed at the opposite end of each the low fiber count fiber ribbon protected portions 68 to the breakout device. The fan-out device separates the individual fibers from the optical finer ribbons after which they are inserted through a 900 micron buffer tube and terminated with an optical fiber connector 70.

The total length of the cable harness can be from about 25 m to about 300 m long to allow the first end of the cable harness to exit the telecommunication cabinet and pass into a manhole, underground vault or hand hole or up a telephone port where in can enter into a telecommunication splice closure to be spliced into a fiber distribution cable(s) and or feeder cables.

To make an exemplary optical fiber cable harness 60 from a section of high fiber count outside plant fiber cables containing four 12 fiber ribbons, the outer layers of the cable are removed from a first end of the cable for about 3 m to expose the fiber ribbons. At least one of the fiber ribbons is inserted into a protective ribbon sleeve 68a. This is repeated until all of the fiber ribbons are in protective ribbon sleeves (Note only 2 of the four protective sleeves are shown in the figure in order to maintain clarity). Next, a piece of expandable braided tubing 62a (¼ in. nominal ID) is slid over the protective ribbon sleeves and part way over the cable sheath 64a. This junction is potted with a resin material, for example the resin material can be an epoxy adhesive. The potted area is covered by a piece of 3:1 heat shrink tubing (for example, a 4"-6" piece) creating breakout device 63. The other end of the braided tubing is secured around the protective ribbon sleeves by another piece of heat shrink tubing (for example, a 4"-6" piece). The braided tubing covered protective ribbon sleeves forms the high fiber count flexible fiber ribbon routing portion 62. The exposed protective ribbon sleeves beyond the braided tubing is the low fiber count fiber ribbon protected portions 68.

Next, each of the fiber ribbons can be separated into individual optical fibers, each of which is fed through a color coded or individually labeled 900 micron loose buffer tubing. The interface region of the fiber ribbon in the protective ribbon sleeves and the individual fibers in individual buffer tubes is potted and then covered with a short piece of heat shrink tubing to form fan-out device 66. Finally a section of the 900 micron buffer tube is the optical fiber disposed therein. These optical fibers can be terminated with a SC (or LC) optical fiber connector by a conventional process.

Referring to FIGS. 4A and 7A-7C, the optical fiber connectors 70 at the ends of the cable harness fibers are disposed in the rear port of optical fiber connector adapters 159 in connection module 150. Each of the fan-out devices 66 are tied down flange 154 of the base plate of the connection module by cable ties (not shown) threaded through openings in said flange. After this is done the protective cover 155 can be attached to the base plate 152 with mechanical fasteners, adhesive and or welding to create the completed connection module assembly. The installation of the connection module assembly to the frame body will be described in additional detail below.

When two or more optical fiber cable harnesses are used to feed connection module, different color flexible expandable braided tubing can be used to differentiate between the cable harnesses.

Figure 1B:
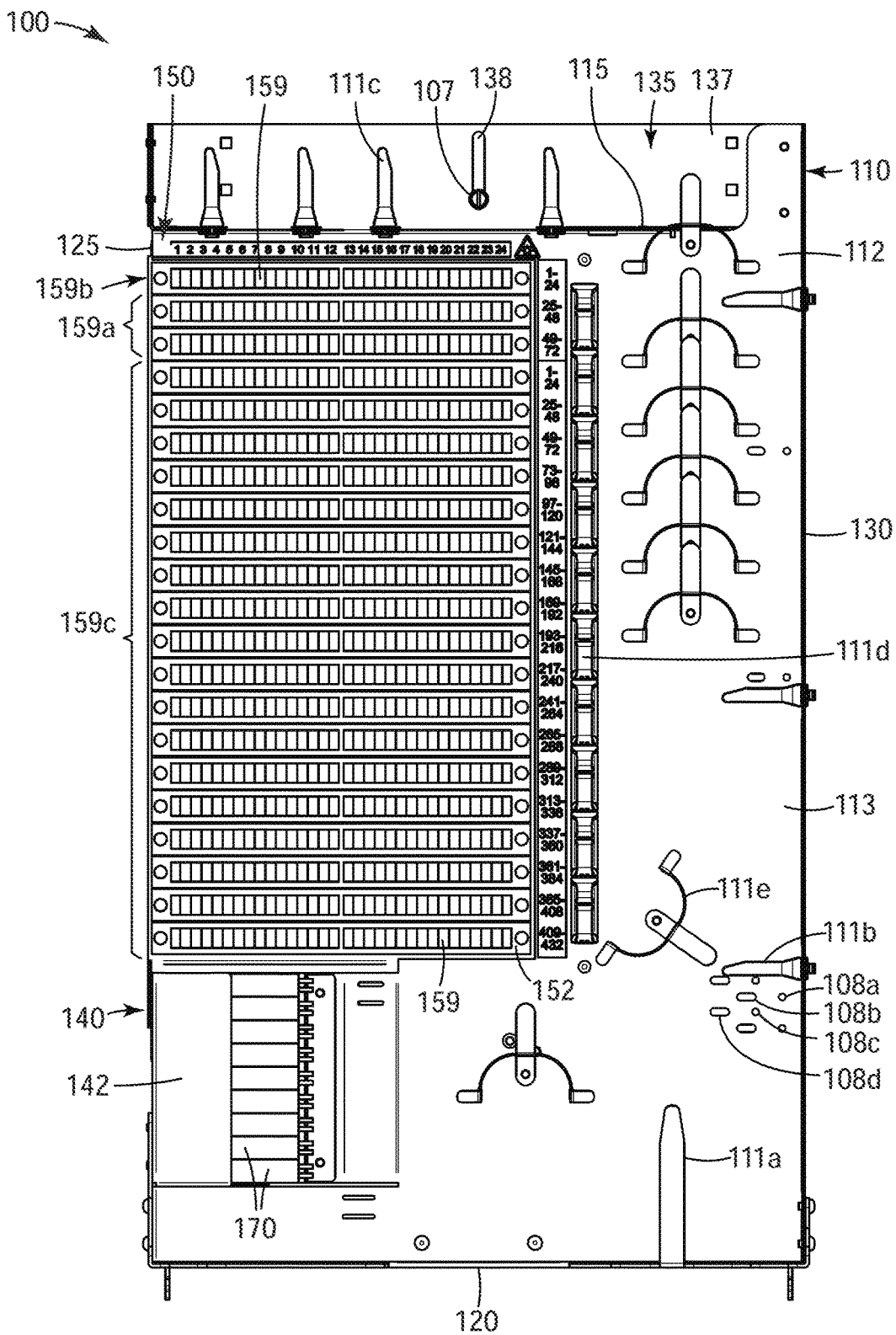
Figure 1C:
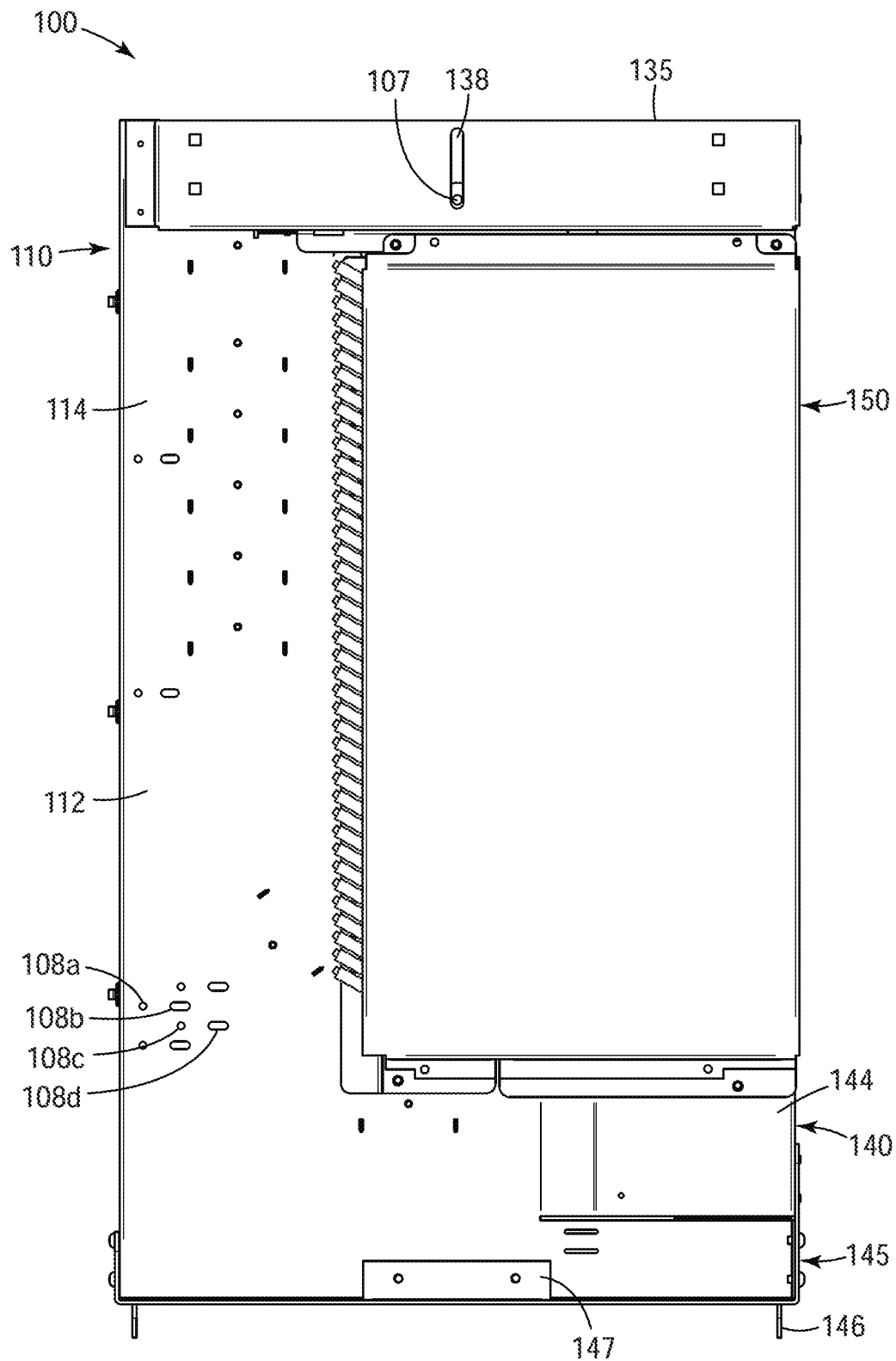
Figure 1D:
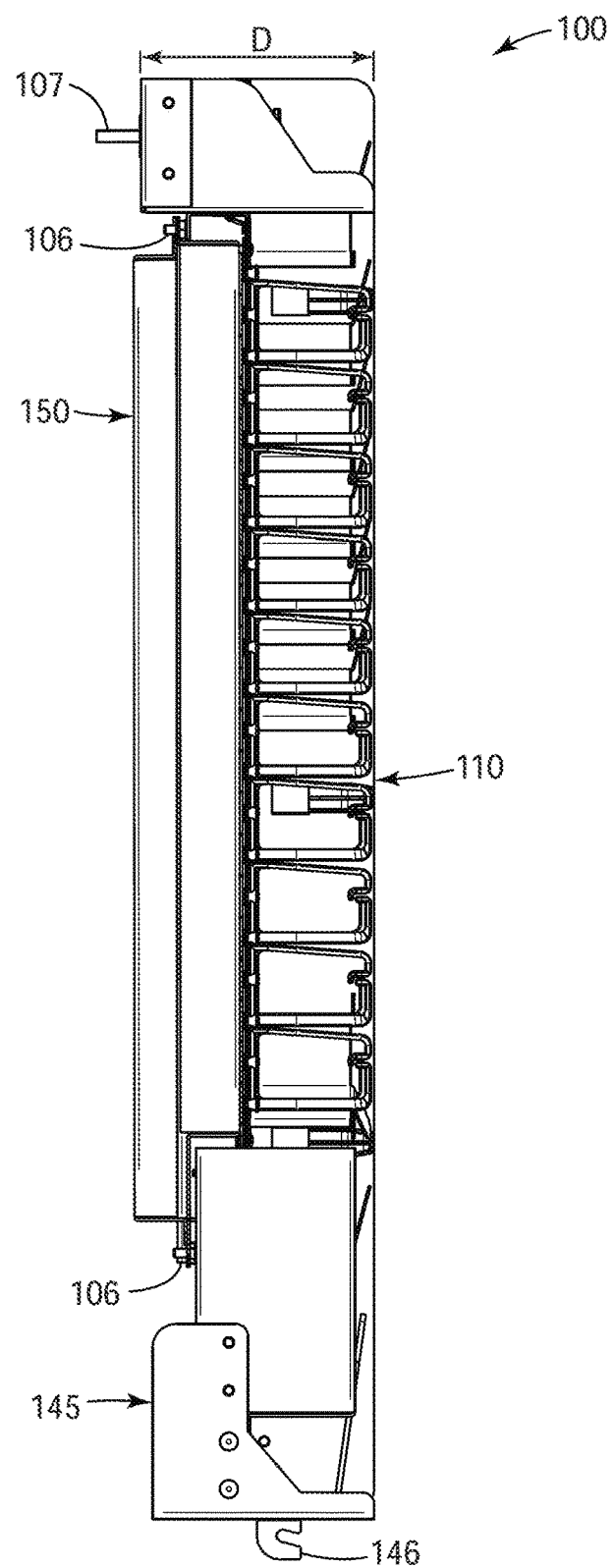
Figure 1E:
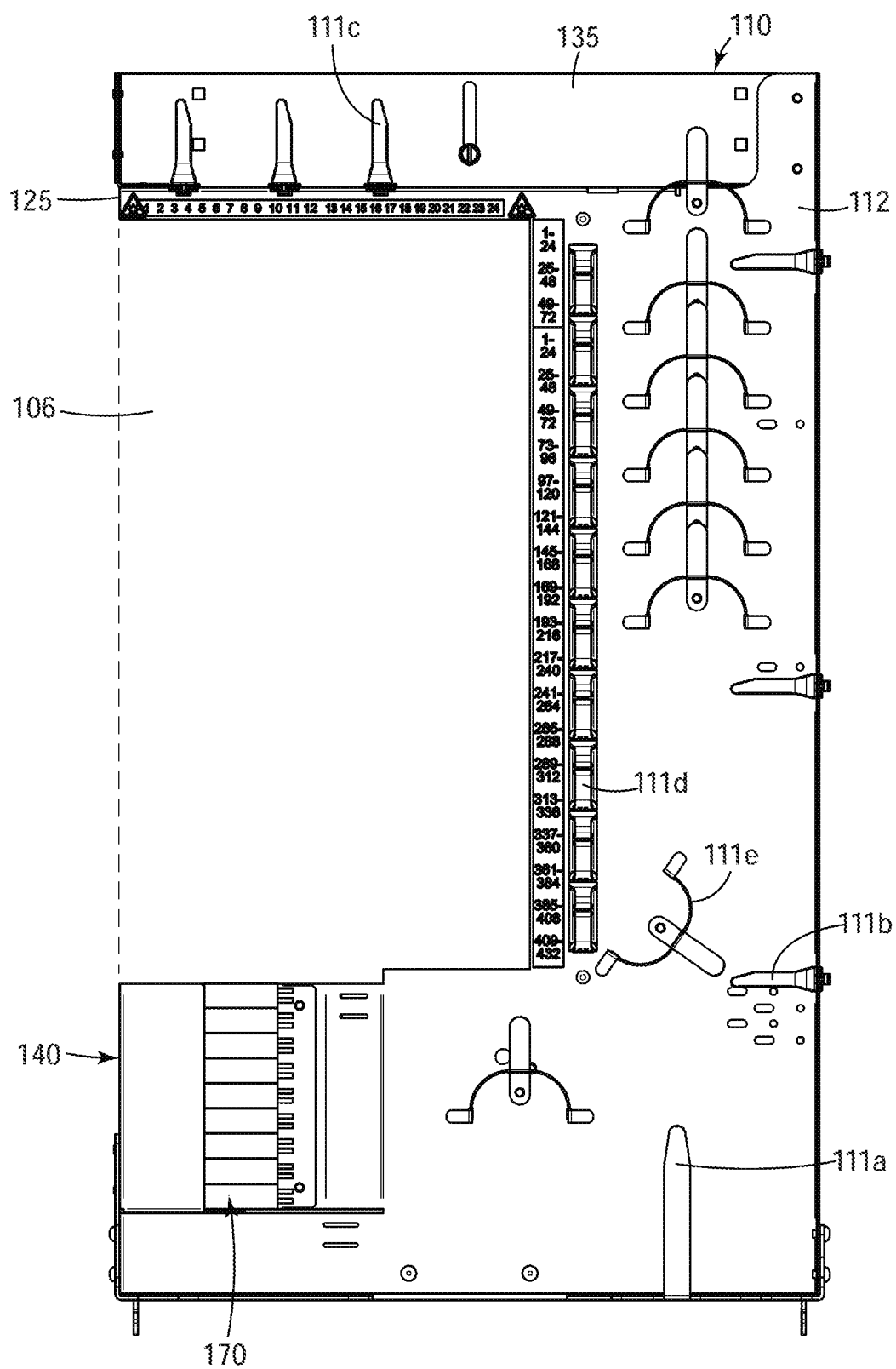

Referring to FIG. 1D, exemplary modular fiber frame 100 has a very shallow depth/draft, D, e.g. less than about 6 in., preferably less than about 5.5 in., most preferably less than 5 in. In an exemplary aspect, the depth is roughly equivalent to a conventional 3M copper cross connect frame. In an exemplary aspect, modular fiber frame 100 is configured to fit in a bay of a telecommunication cross-connect cabinet that is about 18 inches across the face of the bay, about 31 inches tall and less than 6 inches deep.

Figure 8A:
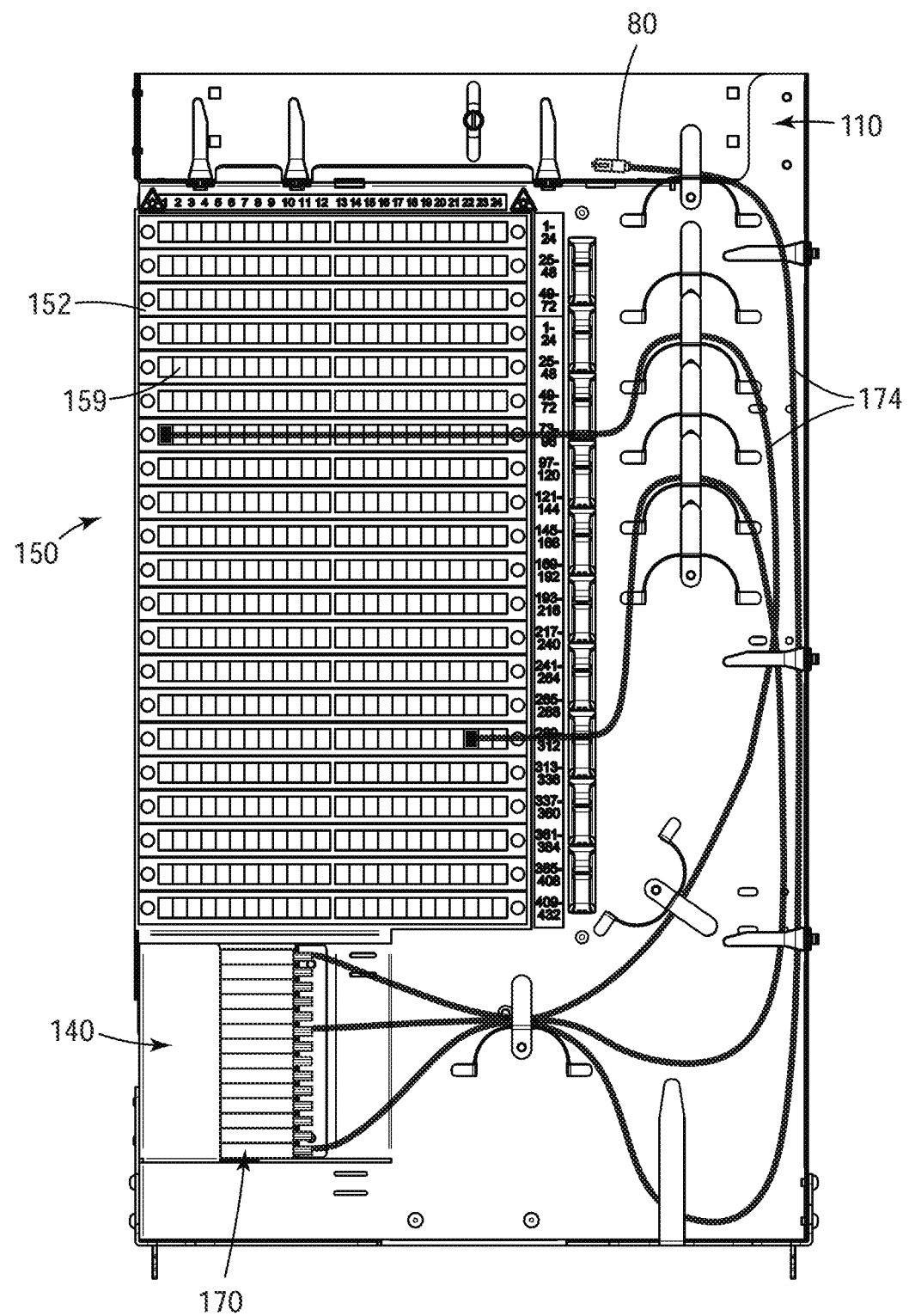
FIGS. 8A-8D are four views showing how the splitter pigtails can be routed on the front side of the frame body of the exemplary modular fiber frame according to an embodiment of the present invention.
Figure 8B:
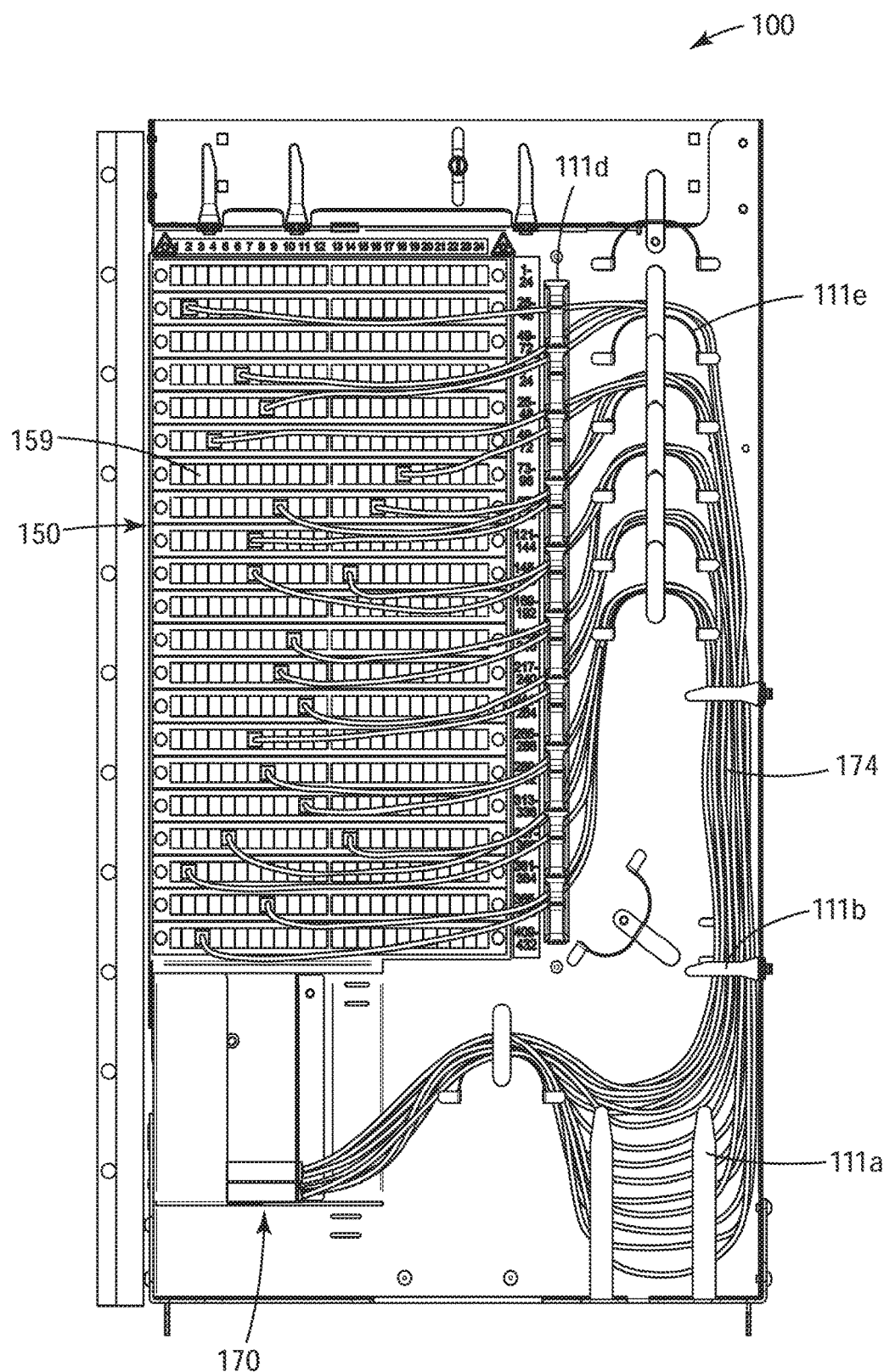
Figure 8C:
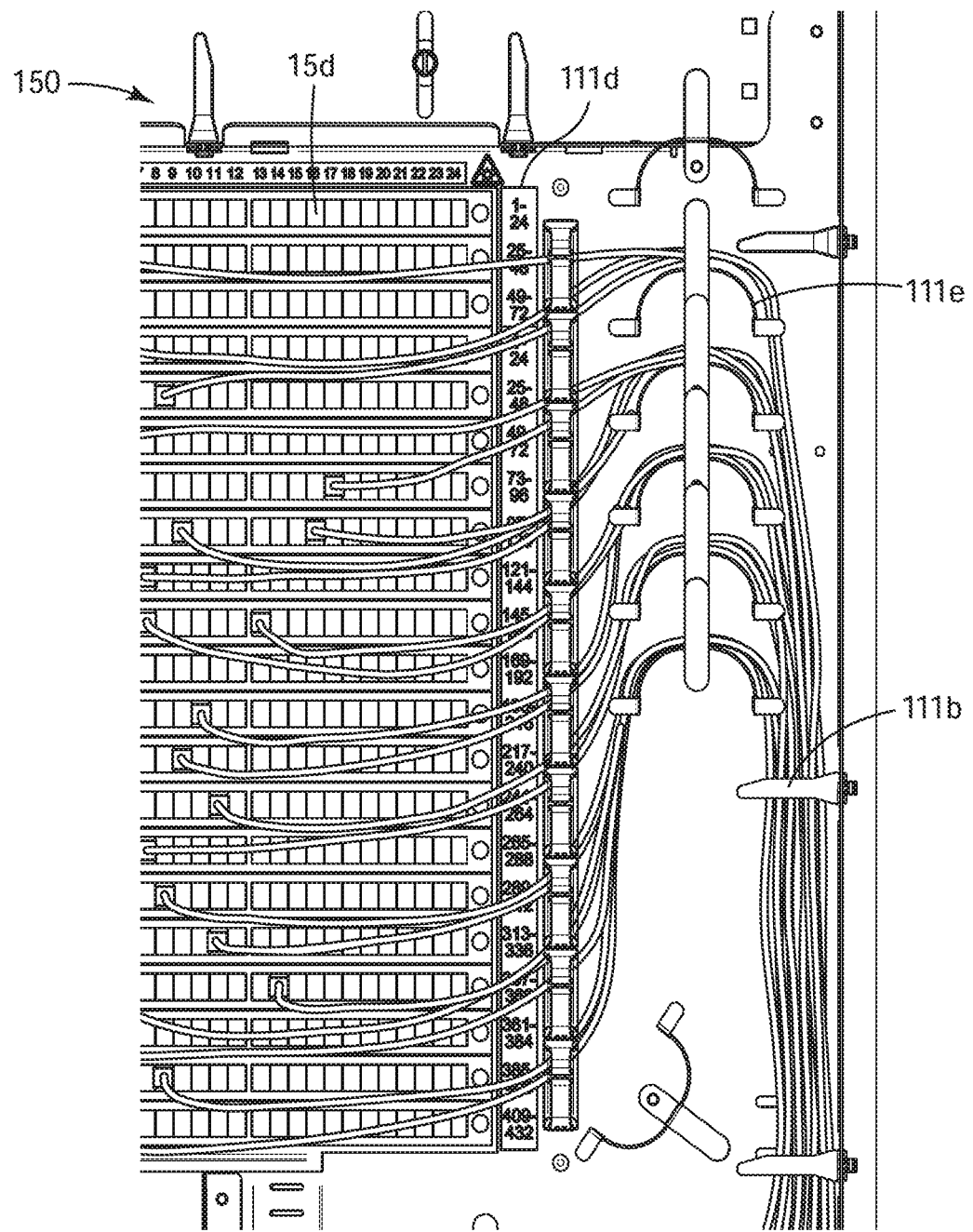
Figure 8D:
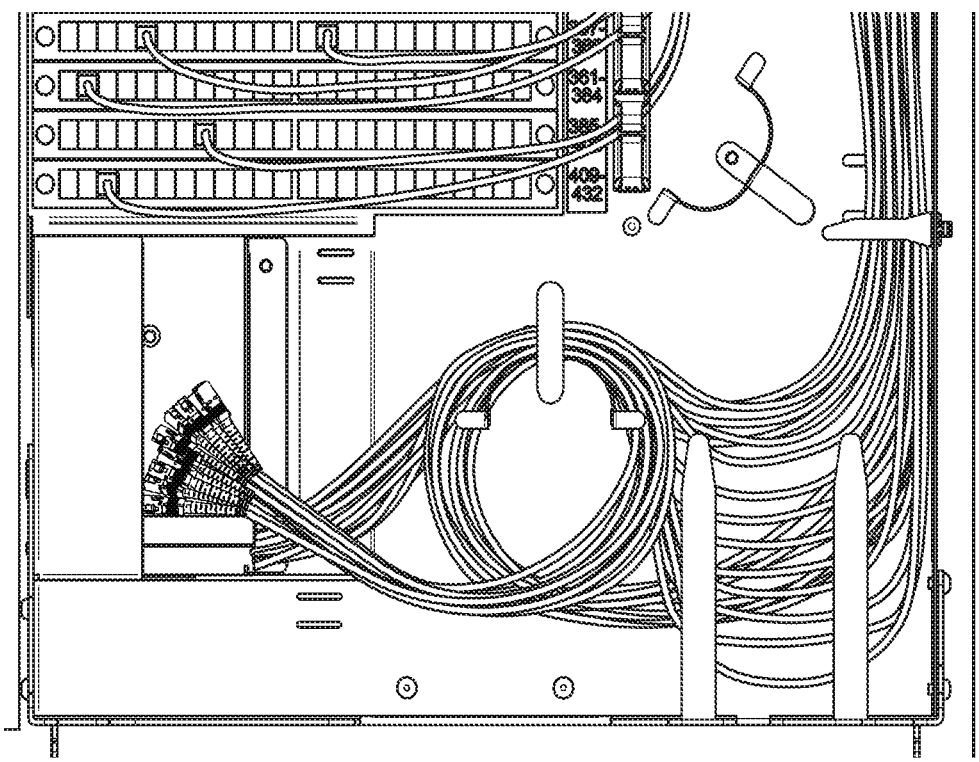

FIGS. 8A-8C illustrate the routing of splitter pigtails on the exemplary modular frame 100 from the optical splitter modules 170 to the connection module 150 and/or to the jumper storage shelf 135. The optical splitter modules are positioned on the modular frame such that splitter pigtails 174 self-organize and can manage slack "over length" with gravity support. The routing of the splitter pigtails can be simplified by defined A-A, B-B, C-C, etc labels placed along the fiber path, or by sequential numbering identifying the splitter module and the splitter pigtail number (e.g., Splitter #2, pigtail 25 to port 283)

The density of ports in the connection module can be doubled by using LC format optical fiber connector adapters and connectors. The overall depth of the LC format modular Fiber frame can have a draft of less than 5.0 in.

Figure 2E:
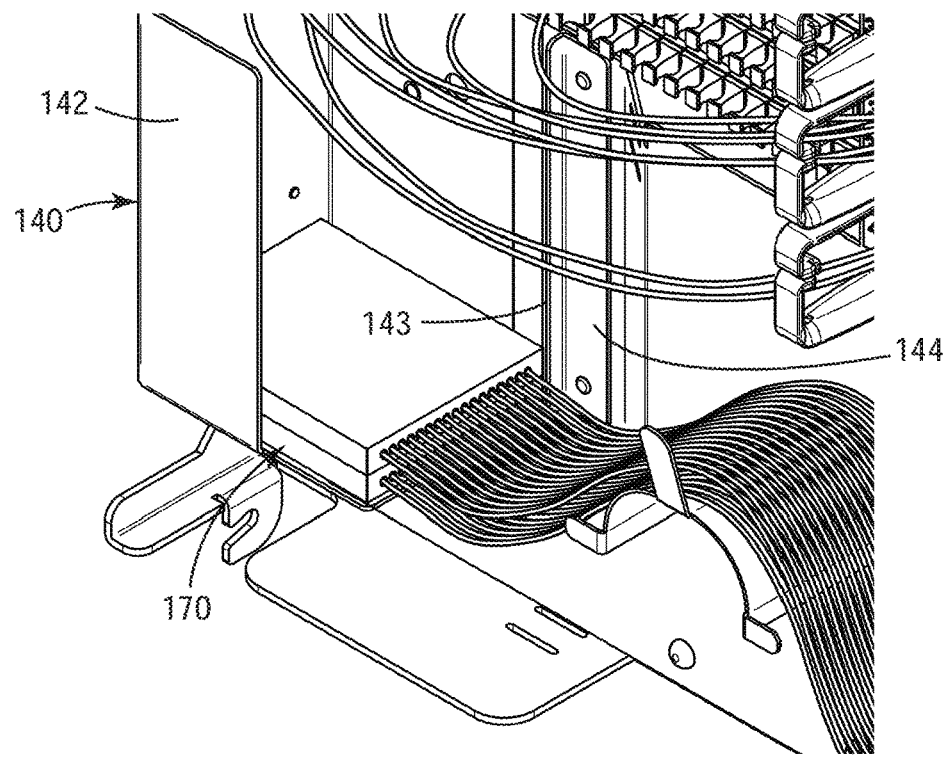
Figure 2F:
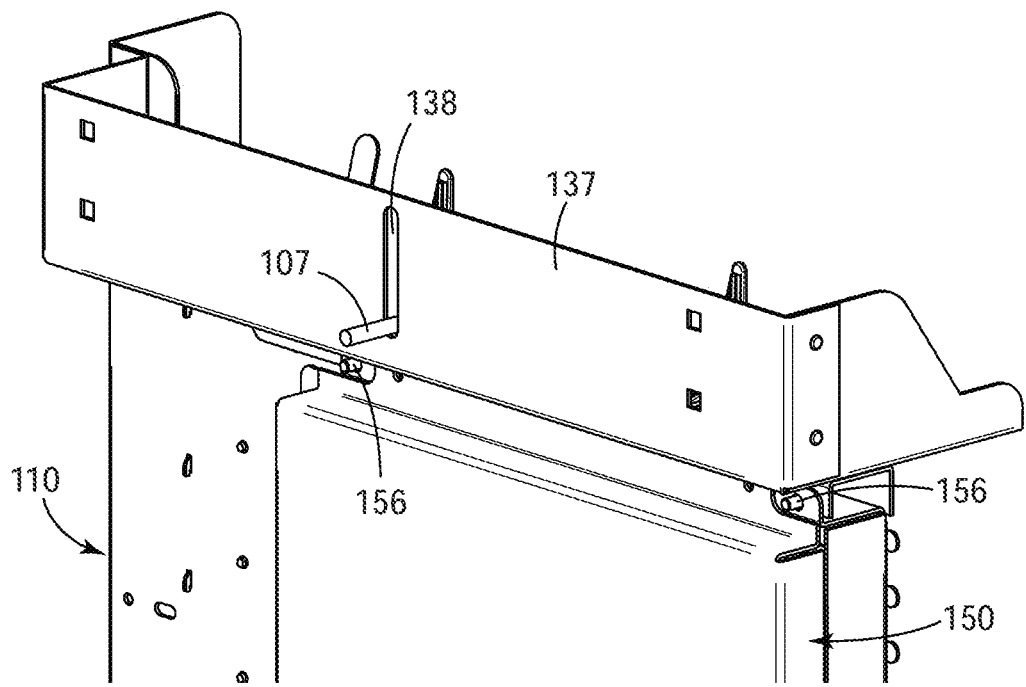
Figure 9A:
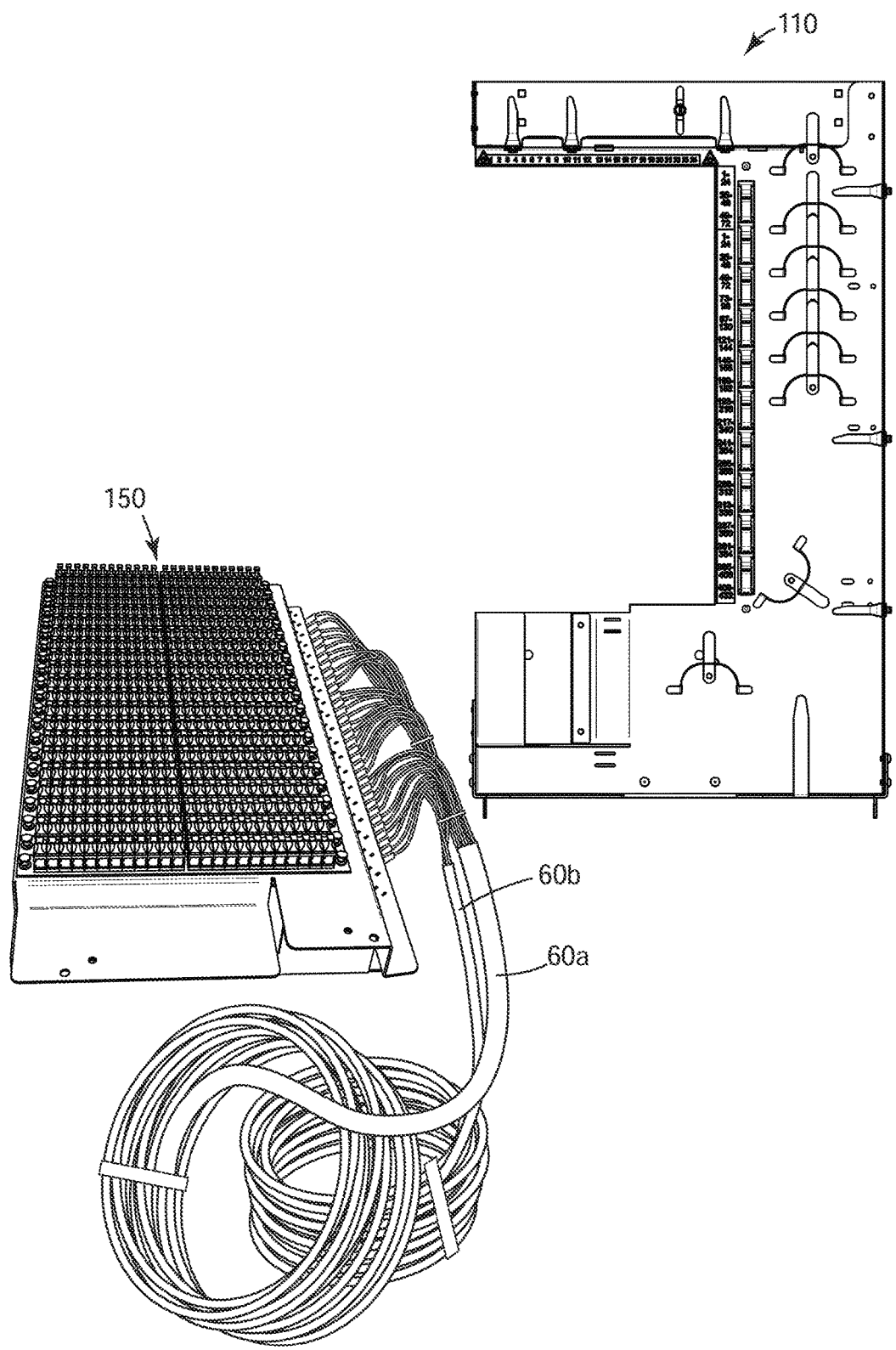
Figure 9B:
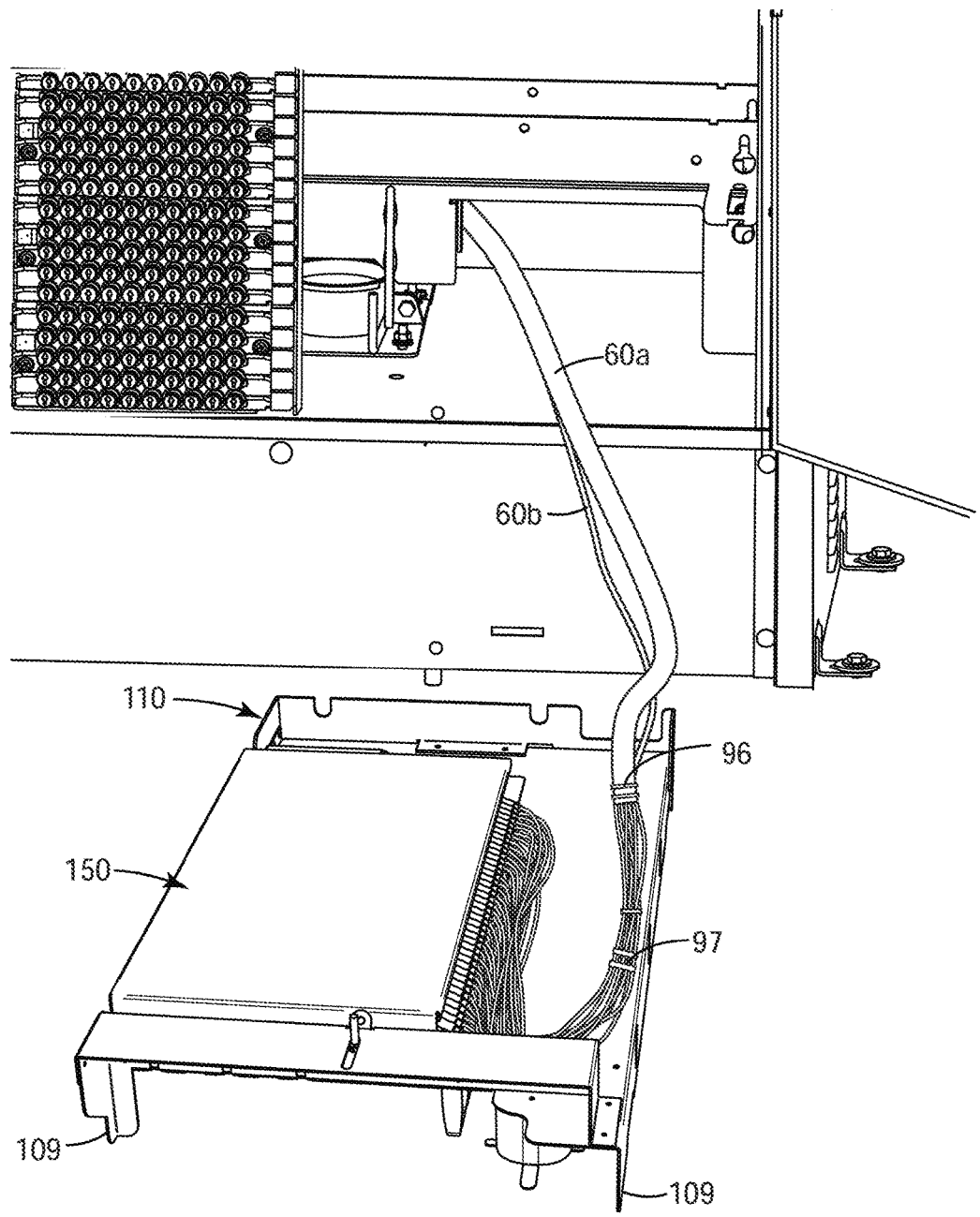

FIGS. 9A-9E with reference to FIGS. 1A-1C. 7A-7C illustrate an exemplary simple process for installing the modular fiber frame 100 of FIG. 1A into a telecommunication cross-connect cabinet. FIG. 9A illustrates how the components of the modular fiber frame arrive at the job site. The frame body will arrive in on box and the pre-connectorized connection module assembly (connection module with the cable harness(es) already installed) will arrive in a second box. First, the frame body 110 is placed on its stand-off supports 109, front side down on the ground as shown in FIG. 9B. Next, the connection module 150 is placed over cutout portion 111 and onto the threaded attachment posts extending from the back side of the frame body 110 (FIG. 2E). Nuts (not shown) are tightened down on the threaded attachment posts to secure the connection module to the frame body.

Next, the cable harnesses 60a, 60b are secured to the frame body at tie down portion 69 by cable ties 96 that are passed through paired tie openings 108a-108d. Each pair of tie openings includes a small round hole 108a, 108c that is just large enough to allow the tail of the cable tie to pass therethrough and an elongated slot 108b, 108d which makes it easier to feed the tail of the cable ties back through the frame body. Additional cable bundling straps 97 can be used along the low fiber count fiber ribbon protected portions 68 to support this portion of the cable harness on the frame body.

Figure 9D:
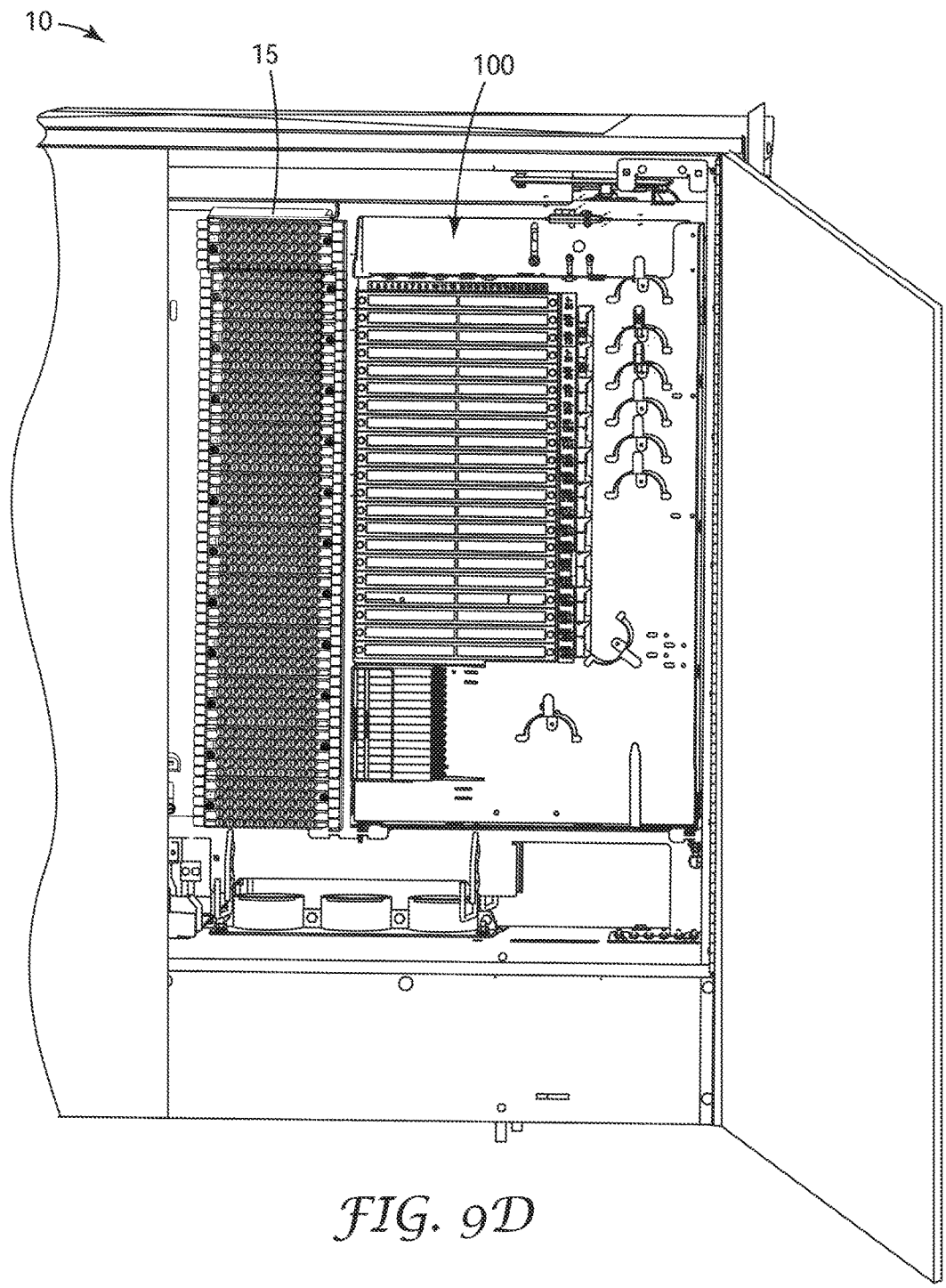
Figure 9E:
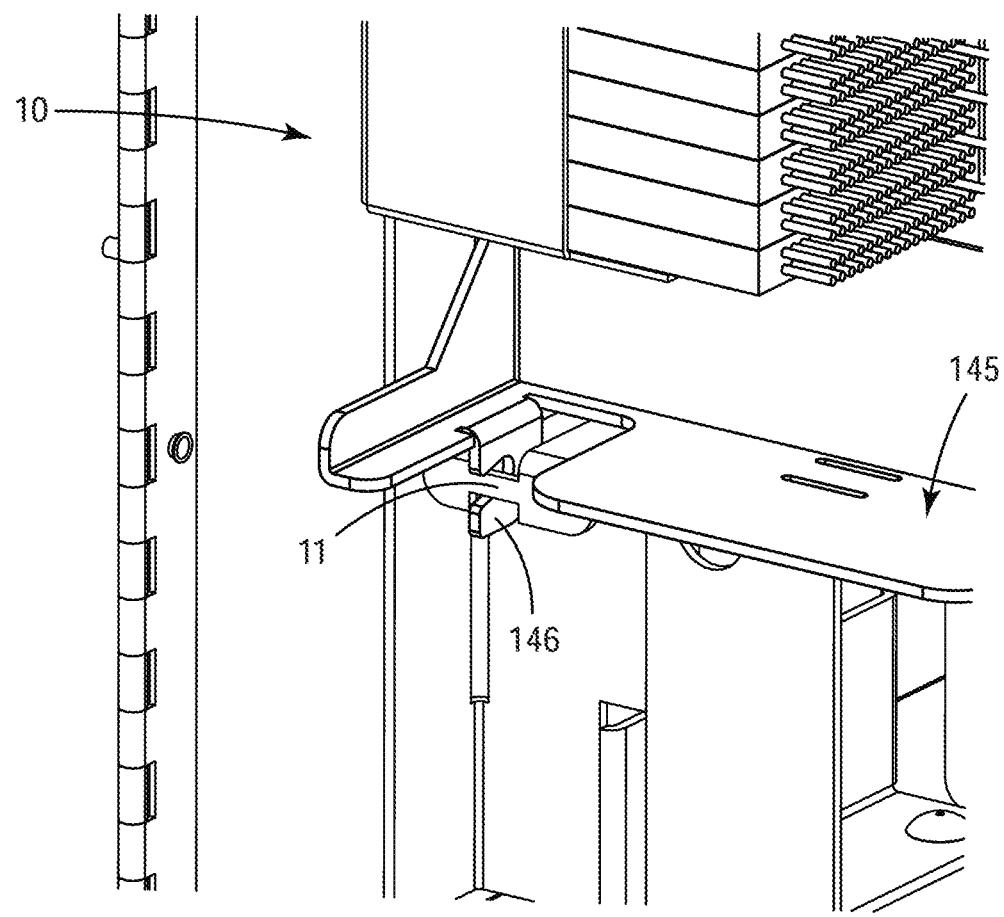

Once the cable harnesses 60a, 60b are secured to the frame body, the field technician is free to route the semi rigid portion 64 of the cable harnesses to a splice closure (not shown) at a remote location where the fibers of the cable harnesses will be joined to the feeder cables from the central office and the distribution cables leading to end users. The cable harness is clamped at the cable port into the cabinet using a conventional strain relief bracket and hose clamps (not shown). The frame body with the connection module attached thereto is now moved into position in the cabinet so that the mounting hooks 146 on the frame support 145 engage with support rods 11 in the telecommunication cabinet 10 as shown in FIGS. 9C and 9E. The modular fiber frame is then swung up to its vertical position (represented by directional arrow 99) where it is locked in place by locking bolt 107. FIG. 9D shows the modular fiber frame secured in to telecommunication cabinet adjacent to copper cross connection frames 15.

The final step in the installation is to place the optical splitter modules in the splitter bracket and rout the splitter pigtails to either the fiber optic connector adapters to establish service of if not all the pigtails are put into service the unused portion can be routed to the jumper storage shelf 135 until they are needed.

Figure 10:
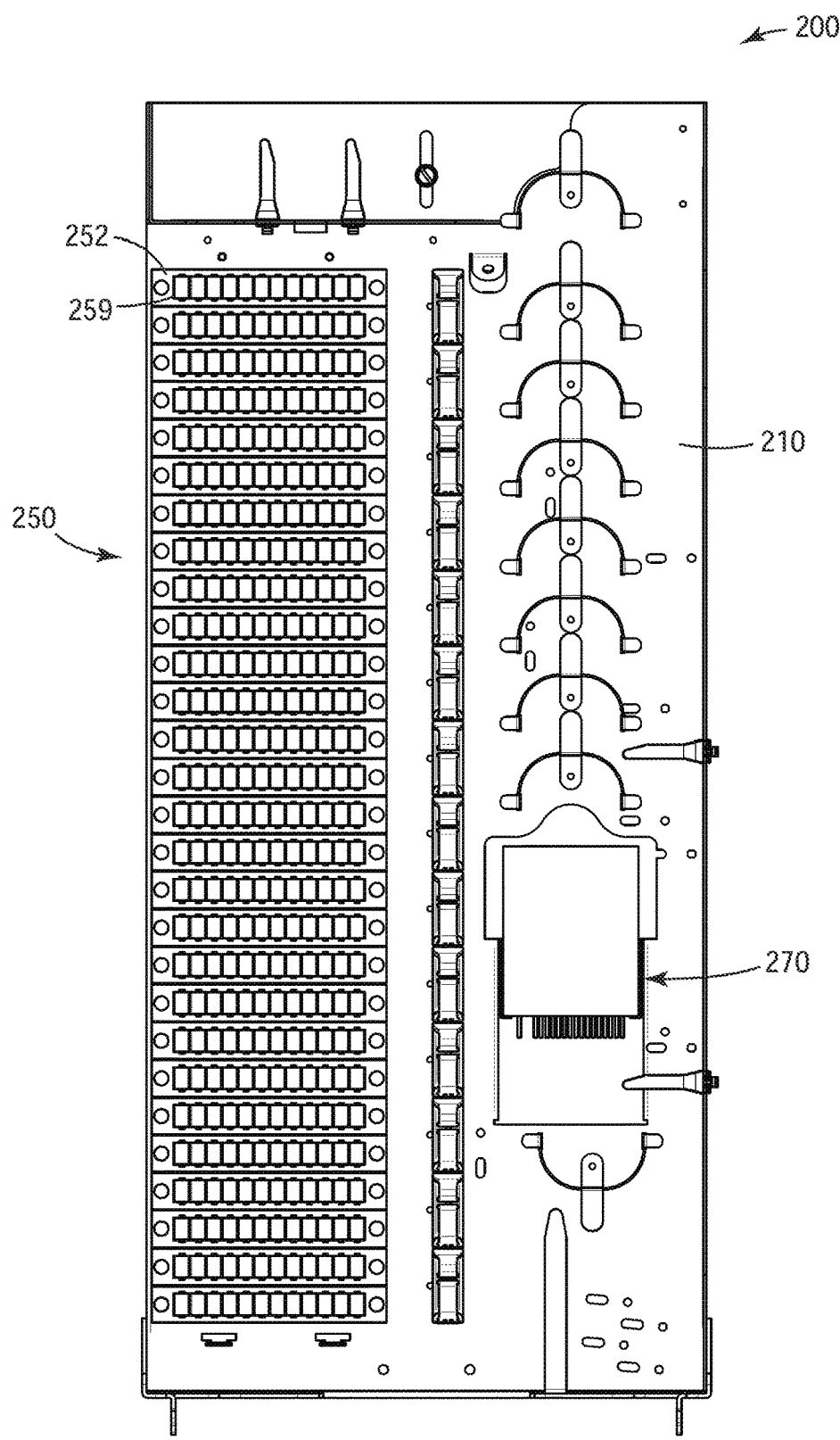
FIG. 10 is a view of another exemplary modular fiber frame according to an embodiment of the present invention.

FIG. 10 shows a second embodiment of a modular fiber frame 200 having a distribution connection capacity of 288 with 24 feeder connections and 24 pass through connections and utilizes one 288 fiber cable harness and one 48 fiber cable harness split between the feeder and pass through connections. In this embodiment the optical splitter modules 270 have been moved to the right hand side of the frame body 210 and are oriented so that the splitter pigtails (not shown) exit the optical splitter module toward the bottom of the frame body.

The connection module in this embodiment includes 28 connection plates 252; each connection plate is configured to hold twelve SC optical fiber connector adapters 254. In an exemplary aspect, modular fiber frame 200 is configured to fit in a bay of a telecommunication cross-connect cabinet that is about 13 inches across the face of the bay, about 31 inches tall and less than 6 inches deep.

Figure 11:
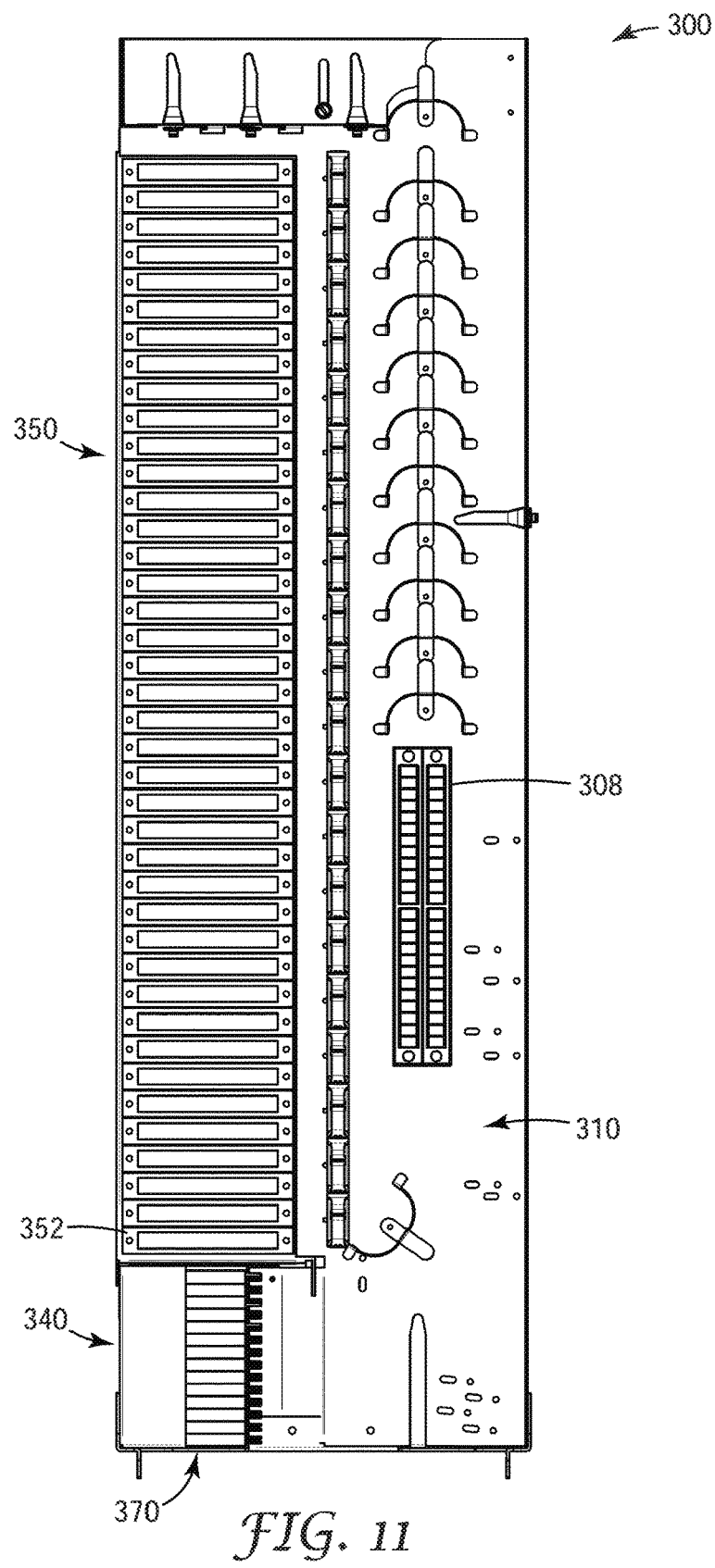
FIG. 11 is a view of a third exemplary modular fiber frame according to an embodiment of the present invention.

FIG. 11 shows a third embodiment of a modular fiber frame 300 having a distribution connection capacity of 432 with 48 feeder connections and 48 pass through connections. The pass through connections 308 are located on the frame body rather than on the connection module. In this embodiment, the connection panel 350 includes 40 connection plates 352; each connection plate is configured to hold twelve SC optical fiber connector adapters (not shown). In an exemplary aspect, modular fiber frame 300 is configured to fit in a bay of a telecommunication cross-connect cabinet that is about 13 inches across the face of the bay, about 46 inches tall and less than 6 inches deep.

Figure 12A:
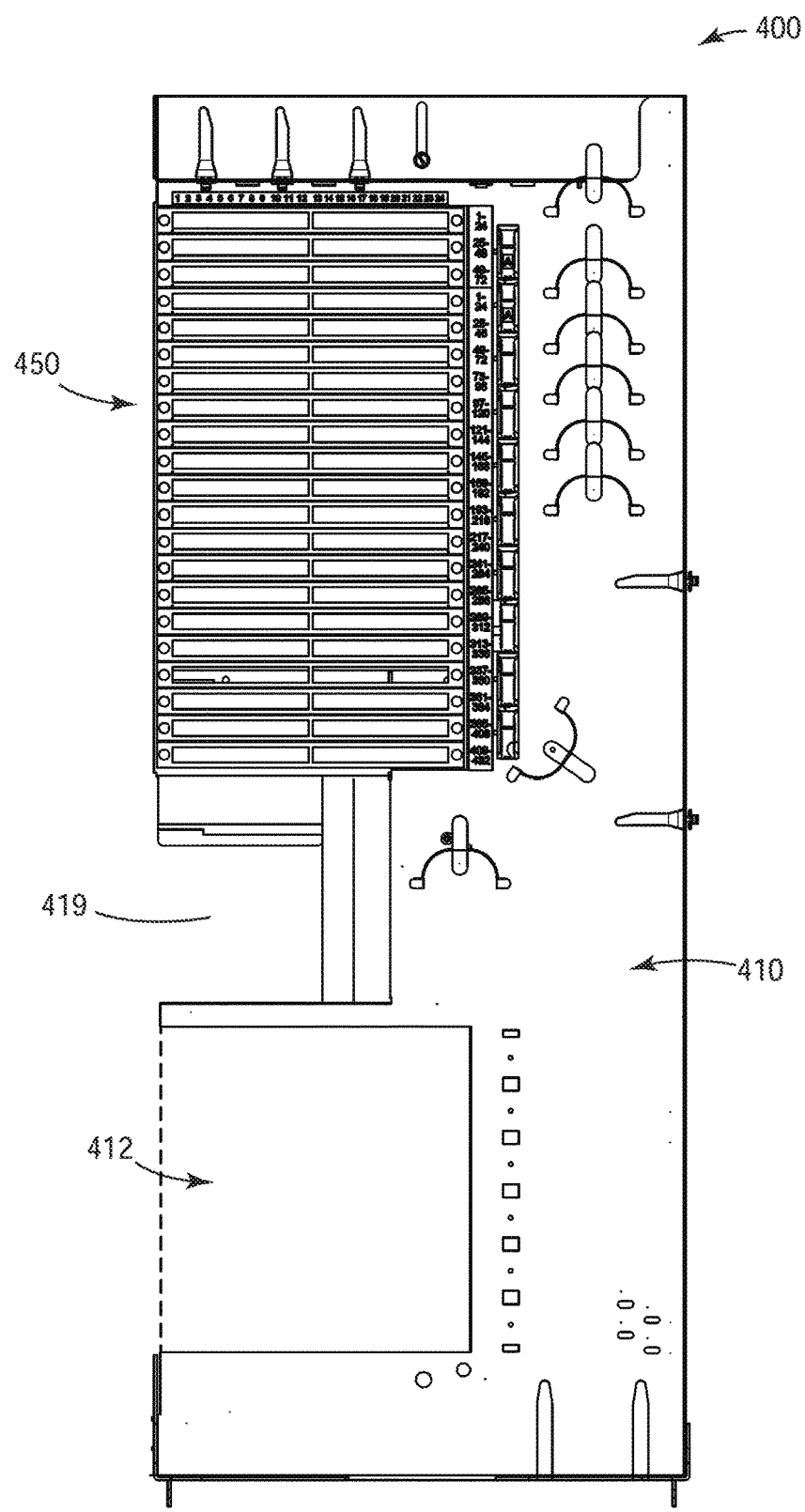
FIGS. 12A-12C are three views of a fourth exemplary modular fiber frame according to an embodiment of the present invention.
Figure 12B:
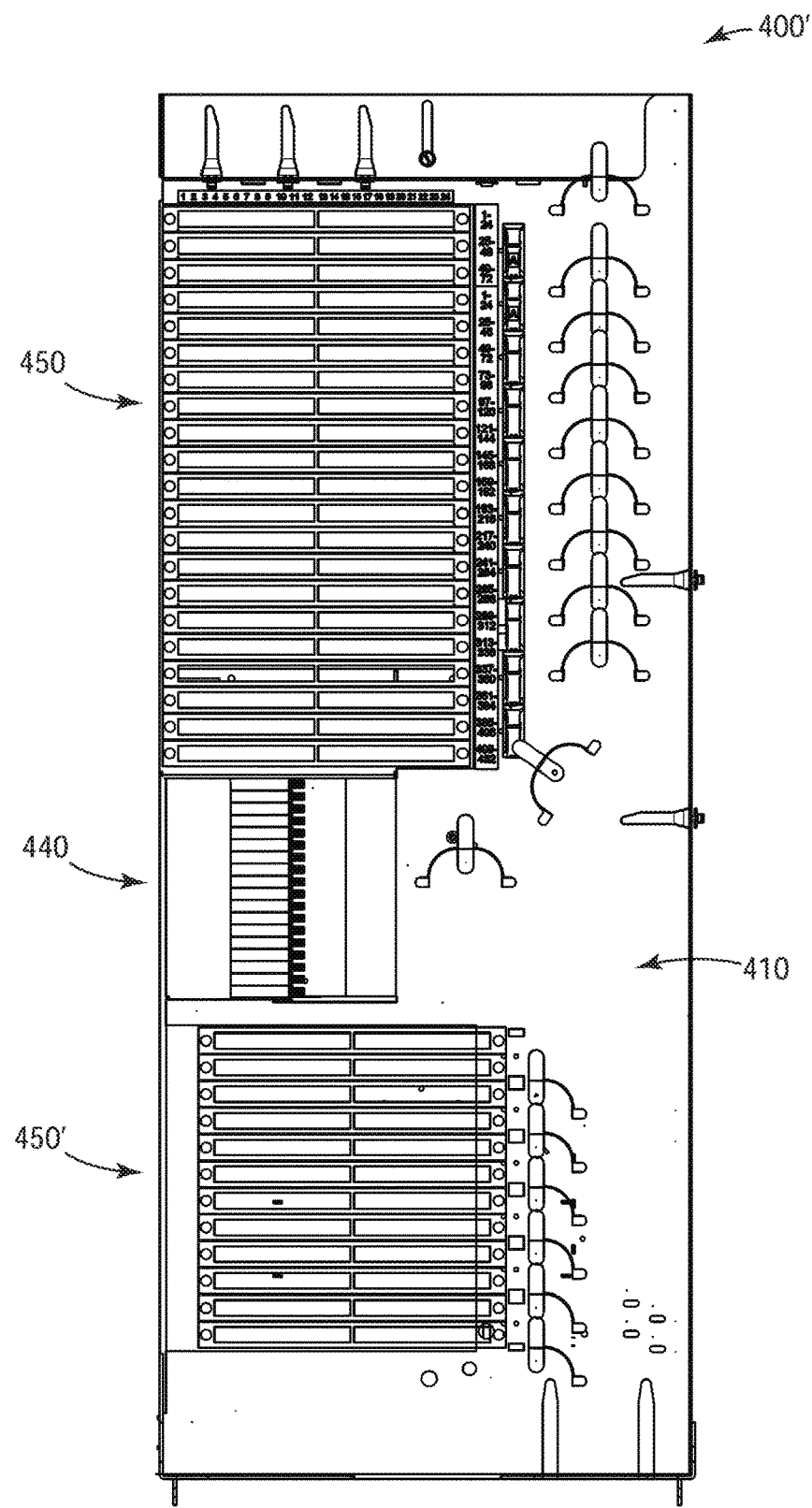
Figure 12C:
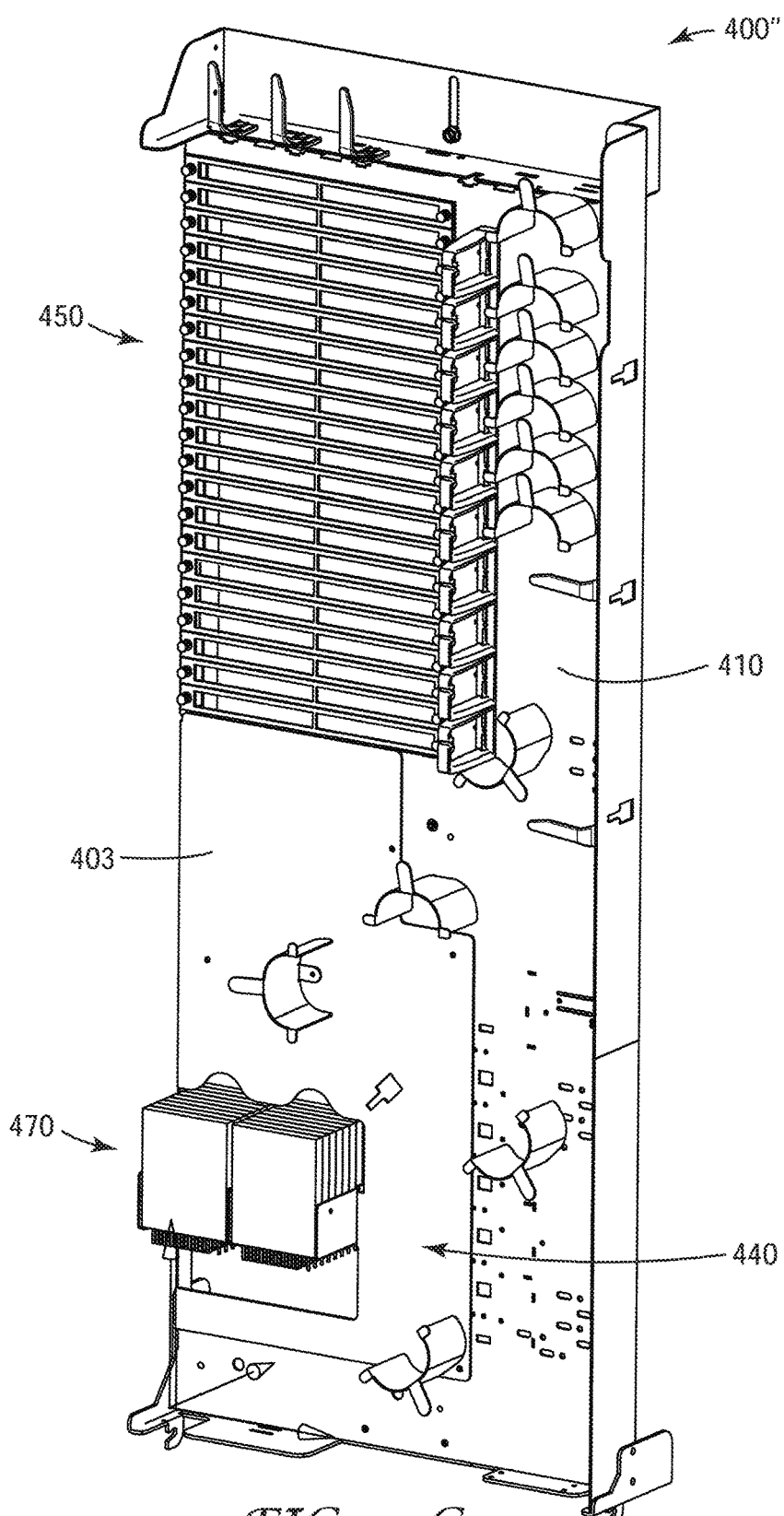

FIGS. 12A-12C are three views of a fourth exemplary modular fiber frame 400 illustrating the ability to configure the volume of the modular fiber frame to function in multiple applications. FIG. 12A shows the frame body 410 with a first connection module 450 mounted on the upper half of the frame body, an opening 419 for mounting a splitter bracket in the middle of the frame body and a second cutout portion 412 on the lower half of the frame body to accept a second module. In one aspect, a second connection module 450' can be attached to the lower half of the frame body to expand connection density as shown in FIG. 12B from 432 SC distribution connection in the configuration of FIG. 12A or 576 SC distribution connections in the configuration of FIG. 12B.

The 432 distribution connection capacity shown in FIG. 12A can include 432 distribution connections, 48 feeder connections and 24 pass through connections and utilizes one 432 fiber cable harness and one 72 fiber cable harness. Optionally, a blank panel can be used to cover the second cutout portion 412 on the bottom half of the frame body.

The 576 distribution connection capacity shown in FIG. 12B can include 573 distribution connections, 72 feeder connections and 72 pass through connections and utilizes two 288 fiber cable harnesses and two 72 fiber cable harnesses. The connection density can be as much as doubled if an LC connection format is used.

In the alternate configuration shown in FIG. 12C, in the modular fiber frame 400" includes a second connection module can be replaced by a splitter tray 440 and additional slack storage capacity for longer splitter tails that enable reaching additional modular frames and making connections in another portion of the same telecommunication cabinet. The advantage of this latter configuration is realized when the distribution serving area of the cabinet is larger than the capacity of one single frame, and the available volume in the cabinet allows placement of multiple modular fiber frames.

Figure 13:
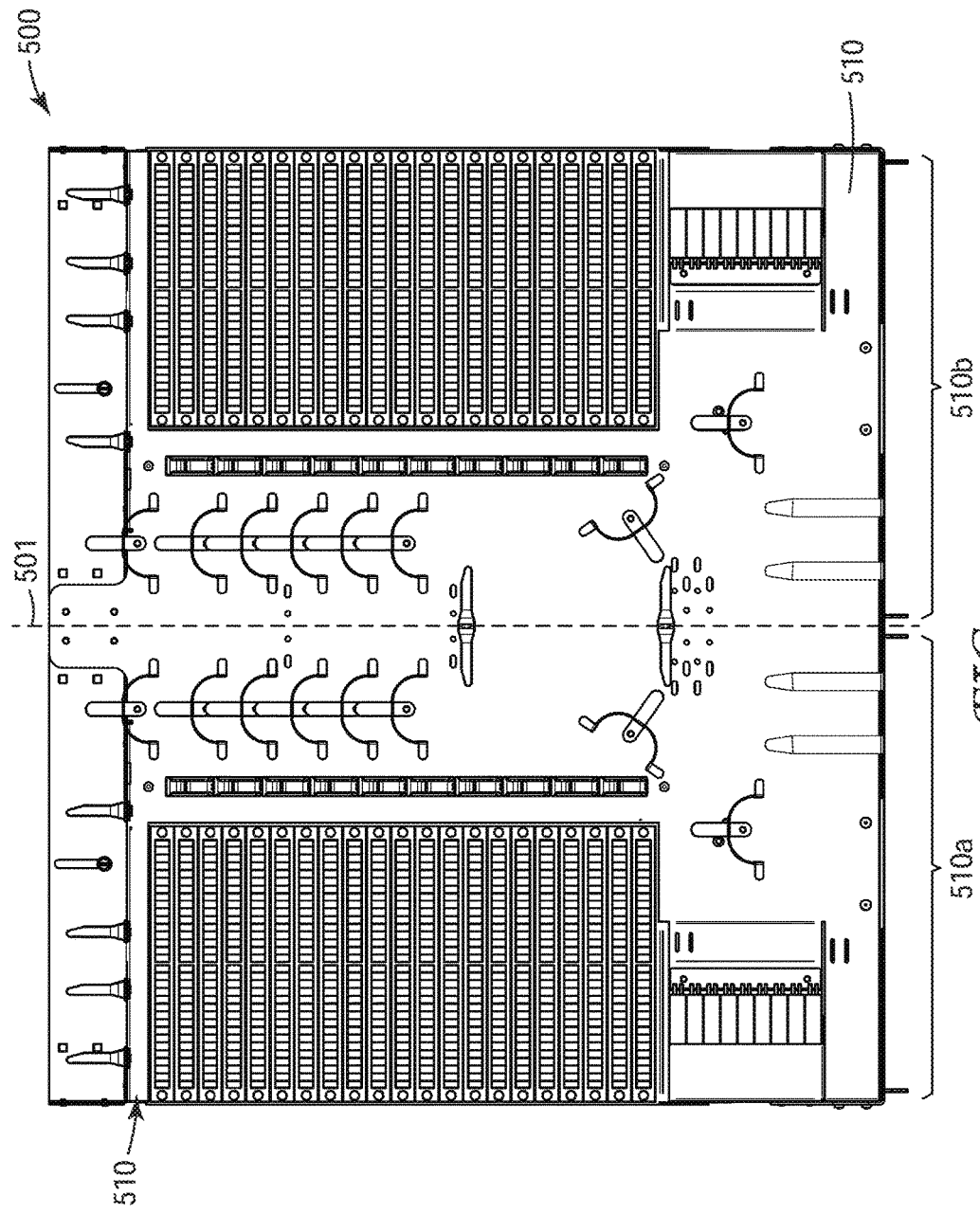
FIG. 13 is a view of a fifth exemplary modular fiber frame according to an embodiment of the present invention.

FIG. 13 shows a fifth exemplary modular fiber frame 500 that is twice as wide and can be disposed in a telecommunication cabinet having two adjacent empty bays. If one were to vertically bisect this modular fiber frame (dashed line 501), the left half 510a of the modular fiber frame looks and is substantially the same as modular fiber frame 100 shown in FIGS. 1A-1C, while the right half 510b of this modular fiber frame is the mirror image of the left half.

Modular fiber frame 500 is configured to have a distribution connection capacity of 864 SC format distribution connections. The 864 distribution connection capacity can include 864 distribution connections (432 on each half), 96 feeder connections and 48 pass through connections and utilizes two 432 fiber cable harnesses and four 48 fiber cable harnesses for the feeder and pass through connections. This design allows patching between the left and right halves of the frame body 510.

In an alternative design this exemplary modular fiber frame can have 864 distribution connections (432 on each half), 72 feeder connections and 72 pass through connections depending on the needs of the particular fiber network overlay.

Figure 14:
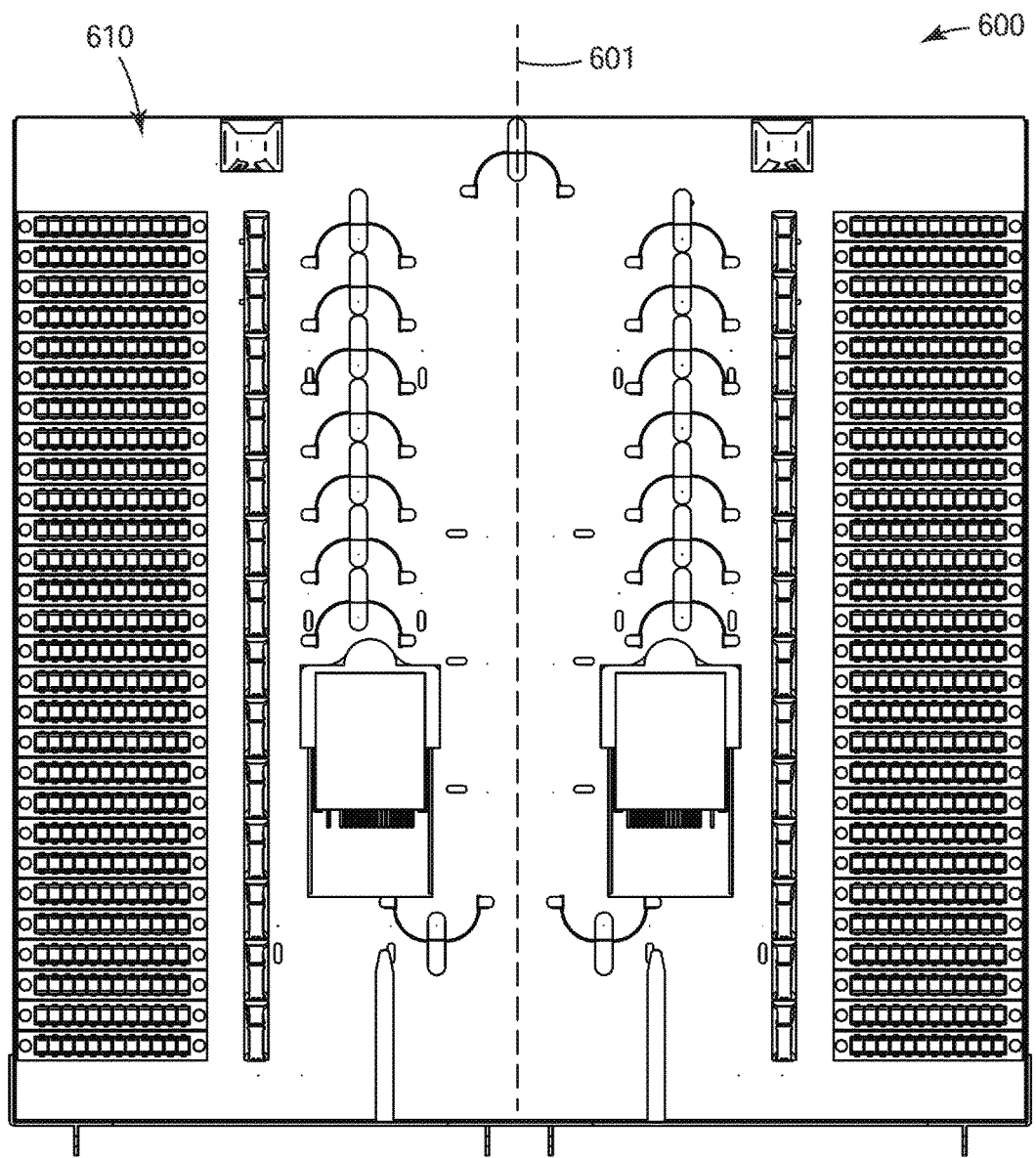
FIG. 14 is a view of a sixth exemplary modular fiber frame according to an embodiment of the present invention.

The embodiment of the modular fiber frame 600 in FIG. 14 is the double wide version of the modular fiber frame 200 shown in FIG. 10. Modular fiber frame 600 is configured to have a distribution connection capacity of 576 SC format distribution connections. The 576 distribution connection capacity can include 576 distribution connections (288 on each half), 48 feeder connections and 48 pass through connections and utilizes two 288 fiber cable harnesses and two 48 fiber cable harnesses for the feeder and pass through connections. This design allows patching between the left and right sides of the frame body 610.

These double wide versions of the exemplary modular fiber frames 500, 600 allow expansion to the backside of a cabinet that has been expanded from a single side to a double sided cabinet, which can be quite advantageous. The use of the space gained needs to be extremely efficient, and the lower profile solution of the exemplary modular fiber frames can be used.

Advantages of at least some embodiments of the exemplary modular fiber frame described herein can include: the ability to use ruggedized optical splitter modules having the same length splitter pigtails or a conventional optical splitter modules or WDM modules in conjunction with one length of fiber jumper cable. Unused splitter pigtail connectors can be stored on the jumper storage shelf prior to being put into service. The connection module can be used in different configurations depending on the application, space availability in the cabinet and desired connection density. The exemplary modular fiber is configured with a jumper path along the bottom edge of the frame body to allow splitter pigtails to access the cabinet's jumper runs so that they can be routed to another frame at another location in the cabinet for interconnection. The front side splitter pigtail routing allows optical splitter modules to be added based on the service take rate without disturbing existing connections, saving the upfront cost of extra optical splitter modules. After installation, the exemplary modular fiber frame is stationary allowing the technician to field technician to access do routine maintenance, establish service connections or clean the cable harness connectors plugged into the backside of the optical fiber connector adapters held by the connection module from the front side of the exemplary modular fiber frame.

In a first embodiment, a modular fiber frame is disclosed. The modular fiber frame comprises a generally rectangular frame body having a front side and a back side, a high density connection module attached to the frame body, a splitter bracket configured to hold a plurality of optical splitter modules disposed on the front side of the frame body, wherein all connections to the plurality of optical splitter modules are made on the front side of the modular fiber frame, and a preterminated cable harness optically connected to connection ports on a back of the connection module, wherein the connection module includes a protective cover over said connection ports. In some embodiments, the exemplary modular fiber frame can utilize a second preterminated cable harness optically connected to a back of the connection module. In some embodiments, the exemplary modular fiber frame has a second connection module attached to the frame body. In some embodiments, a jumper storage shelf can disposed along a top edge of the frame body.

In a second embodiment, a modular fiber frame is disclosed. The modular fiber frame comprises a generally rectangular frame body having a front side and a back side and having a high density connection module integrally formed on apportion of the frame body, a splitter bracket configured to hold a plurality of optical splitter modules disposed on the front side of the frame body, wherein all connections to the plurality of optical splitter modules are made on the front side of the modular fiber frame, and a preterminated cable harness optically connected to connection ports on a back of the connection module, wherein the connection module includes a protective cover over said connection ports. In some embodiments, the exemplary modular fiber frame can utilize a second preterminated cable harness optically connected to a back of the connection module. In some embodiments, the exemplary modular fiber frame has a second connection module attached separately to the frame body to increase the connection density of the modular fiber frame.

The exemplary modular fiber frames described herein characterized by a total depth and wherein that total depth is less than 6 inches. The thinness of the exemplary modular fiber frames enable them to be used in telecommunication cabinets designed to hold conventional Self-Strip or Quick Connect System copper frames such as those available from 3M Company (St. Paul, Minn.).

The connection module of the exemplary modular fiber frame includes a plurality of optical fiber connector adapters mounted through a base plate from a front side of the base plate to a back side of the base plate, each optical fiber connector adapter has a rear connector port on the back side of the base plate and a front connector port on the front side of the base plate. In one aspect, optical fiber connection adapters are mounted in removable connection plates. The connection plates can be removed from the front side of the connection module to clean the cable harness connectors disposed in a rear port of the optical fiber connector adapters.

In some embodiments of the exemplary connection modules hold at least 300 optical fiber connector adapters. Other embodiments of the exemplary connection modules hold at least 400 optical fiber connector adapters.

The optical fiber connector adapters of the connection module are arranged in a plurality of rows. In some embodiments, at least a first portion of the plurality of rows of optical fiber connector adapters are dedicated for feeder connections and least a second portion of the plurality of rows of optical fiber connector adapters are dedicated for distribution connections. The first portion of optical fiber connector adapters dedicated for feeder connections can be disposed above the second portion of optical fiber connector adapters dedicated for distribution connections. In other embodiments, the connection module can optionally include a third portion of the plurality of rows of optical fiber connector adapters are dedicated for pass through connections. The third portion of optical fiber connector adapters dedicated for pass through connections are disposed above the second portion of optical fiber connector adapters dedicated for distribution connections.

In some embodiment of the exemplary modular fiber frame, a second plurality of optical fiber connector adapters extending through the frame body at a location space apart from the connection module. These second plurality of optical fiber connector adapters can be dedicated for pass through connections. In an alternative aspect, these second plurality of optical fiber connector adapters can be dedicated for feeder connections.

The exemplary modular fiber frame has at least 24 feeder connection locations disposed on either the connection module of the frame body, at least 288 distribution connection locations on the connection module and optionally, at least 24 pass through connection locations disposed on either the connection module of the frame body. In some embodiments of the exemplary modular fiber frame the connection module has a connection density of at least 432 distribution connections.

The cable harness(es) used with the exemplary modular fiber frame comprises a plurality of optical fiber ribbons, each optical fiber ribbon separated into a plurality of individual optical fibers in a fan-out device, and each optical fiber having a first optical fiber connector attached to the terminal end of each of the optical fibers. The first optical connectors of the cable harness are installed in the rear ports of the plurality of optical fiber connector adapters extending through a front face of the connection module. The fiber optic fan-out devices are attached to the connection module orthogonal to the axis of the optical fiber connector adapters which enables the thinness of the exemplary modular fiber frame. In some aspects, the cable harness(es) comprises at least 48 optical fibers while in other aspects the cable harness(es) comprises at least 288 optical fibers. The cable harness(es) can be created from conventional outside plant grade optical fiber cables.

In some embodiments, the frame body further comprises stand-off supports extending from the front side of the frame body and disposed near each corner of the frame body, so that the frame body can be laid horizontally without contacting the front surface of the frame body or the front side of the connection module.

The optical splitter modules can be mounted in ae splitter bracket so that they are oriented either horizontally when the modular fiber frame is disposed vertically in a bay of a telecommunication cabinet or parallel to a major surface of the frame body when the modular fiber frame is disposed vertically in a bay of a telecommunication cabinet.

Some of the modular fiber frames of the present are configured to fit in one bay of a telecommunication cabinet, while others are configured to fit in two adjacent bays of a telecommunication cabinet.

The present invention also includes a new method of installing a modular fiber frame in a telecommunication cabinet. A generally rectangular frame body and a connection module assembly comprising a preterminated cable harness optically connected to a back side of a high density connection module are delivered to the job site. The frame body is places face down on a work surface on stand-off supports extending from the front side of the frame body. The connection module assembly is mechanically attached to a back side of the frame body. A second end of the cable harness inserted through a conduit to a remotely located splice closure where it is connected to the network cables. Next, the frame body is inserted into an empty bay in the telecommunication cabinet and locked in a vertical position. Finally, a plurality splitters in a splitter bracket on the front side of the frame body and the splitter fibers are routed and connected to the connection module to establish service or to a jumper storage shelf disposed along its top edge of the frame body.

Various modifications including extending the use of the inlet device to applications with copper telecommunication cables or copper coax cables, equivalent processes, as well as numerous structures to which the present invention may be applicable will be readily apparent to those of skill in the art to which the present invention is directed upon review of the present specification.

We claim:

1. A modular fiber frame, comprising:
   a frame body having a front side a back side, and a generally rectangular shape;
   a high density connection module attached to the frame body;
   a splitter bracket disposed on the front side of the frame body and configured to hold a plurality of optical splitter modules outside the high density connection module, wherein all connections to the plurality of optical splitter modules are made on the front side of the modular fiber frame; and
   a preterminated cable harness optically connected to a back of the high density connection module, wherein the high density connection module includes a protective cover over at least a portion of said preterminated cable harness, and wherein at least a portion of the preterminated cable harness is arranged between the protective cover and the back of the high density connection module.

2. The modular fiber frame of claim 1, wherein the modular fiber frame is characterized by a total depth of less than 6 inches.

3. The modular fiber frame of claim 1, wherein the high density connection module has a plurality of optical fiber connector adapters mounted through a base plate from a front side of the base plate to a back side of the base plate, and each optical fiber connector adapter of the plurality of optical fiber connector adapters has a rear connector port on the back side of the base plate and a front connector port on the front side of the base plate.

4. The modular fiber frame of claim 1, wherein the high density connection module comprises a base plate, a plurality of removable connection plates and a plurality of optical fiber connector adapters mounted in said plurality of removable connection plates.

5. The modular fiber frame of claim 1, wherein the preterminated cable harness comprises a plurality of optical fiber ribbons, each optical fiber ribbon of the plurality of optical fiber ribbons being separated into a plurality of individual optical fibers in a fan-out device, and each optical fiber of the plurality of individual optical fibers having a first optical fiber connector attached to a terminal end of the optical fiber.

6. The modular fiber frame of claim 4, wherein optical fiber connector adapters of the plurality of optical fiber connector adapters are arranged in a plurality of rows.

7. The modular fiber frame of claim 6, wherein at least a first portion of the plurality of rows of optical fiber connector adapters are dedicated for feeder connections and least a second portion of the plurality of rows of optical fiber connector adapters are dedicated for distribution connections.

8. The modular fiber frame of claim 6, wherein the high density connection module has a third portion of the plurality of rows of optical fiber connector adapters that are dedicated for pass through connections.

9. The modular fiber frame of claim 3, further comprising a second plurality of optical fiber connector adapters extending through the frame body at a location space apart from the high density connection module.

10. The modular fiber frame of claim 9, wherein optical fiber connector adapters of the second plurality of optical fiber connector adapters are dedicated for pass through connections.

11. The modular fiber frame of claim 1, wherein the frame body further comprises stand-off supports extending from the front side of the frame body and disposed near each corner of the frame body, so that the frame body can be laid horizontally without contacting the front side of the frame body or a front side of the high density connection module.

12. The modular fiber frame of claim 1 further comprising a second cable harness.

13. The modular fiber frame of claim 1 further comprising a second connection module attached to the frame body.

14. The modular fiber frame of claim 1, wherein optical splitter modules of the plurality of optical splitter modules are disposed horizontally in the splitter bracket when the modular fiber frame is disposed vertically in a bay of a telecommunication cabinet.

15. The modular fiber frame of claim 1, wherein optical splitter modules of the plurality of optical splitter modules are disposed parallel to a major surface of the frame body when the modular fiber frame is disposed vertically in a bay of a telecommunication cabinet.

16. The modular fiber frame of claim 1, wherein the modular fiber frame is configured to fit in one bay of a telecommunication cabinet.

17. The modular fiber frame of claim 16, wherein the telecommunication cabinet is an existing passive copper cross-connect connect cabinet.

18. The modular fiber frame of claim 1, further comprising a jumper storage shelf disposed along a top edge of the frame body.

19. A method of installing a modular fiber frame in a telecommunication cabinet, the method comprising:
    providing a generally rectangular frame body having a jumper storage shelf disposed along a top edge thereof;
    providing a connection module assembly comprising a preterminated cable harness optically connected to a back side of a high density connection module;
    placing the frame body face down on a work surface on stand-off supports extending from a front side of the frame body;
    connecting the high density connection module to a back side of the frame body;
    mounting a plurality of optical splitter modules in a splitter bracket on the front side of the frame body at a position outside the high density connection module;
    inserting the frame body into an empty bay in the telecommunication cabinet; and
    locking the frame body vertically in the empty bay.

20. The method of claim 19, further comprising routing fibers from the plurality of optical splitter modules to the high density connection module to establish service.

21. The method of claim 19, wherein the inserting of the frame body into an empty bay in the telecommunication cabinet includes positioning easy-attach mounting hooks onto attachment rods disposed in the telecommunication cabinet.

* * * * *